(12) United States Patent
Yamamoto et al.

(10) Patent No.: US 8,993,109 B2
(45) Date of Patent: Mar. 31, 2015

(54) VOID-CONTAINING HEAT-SHRINKABLE POLYESTER FILM AND PROCESS FOR PRODUCTION THEREOF

(75) Inventors: Shigetomo Yamamoto, Inuyama (JP); Masayuki Haruta, Tsuruga (JP); Yukinobu Mukoyama, Tsuruga (JP); Masakazu Iwasaki, Inuyama (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 13/377,224

(22) PCT Filed: Jun. 14, 2010

(86) PCT No.: PCT/JP2010/060022
§ 371 (c)(1),
(2), (4) Date: Dec. 12, 2011

(87) PCT Pub. No.: WO2010/143737
PCT Pub. Date: Dec. 16, 2010

(65) Prior Publication Data
US 2012/0100363 A1     Apr. 26, 2012

(30) Foreign Application Priority Data

Jun. 12, 2009 (JP) ................. 2009-140834
Aug. 21, 2009 (JP) ................. 2009-191788
Aug. 21, 2009 (JP) ................. 2009-191789
Aug. 26, 2009 (WO) ............. PCT/JP2009/064827

(51) Int. Cl.
*B32B 3/26* (2006.01)
*B29C 55/10* (2006.01)
(Continued)

(52) U.S. Cl.
CPC ............ *B29C 55/005* (2013.01); *B29C 55/023* (2013.01); *B29C 55/143* (2013.01);
(Continued)

(58) Field of Classification Search
None
See application file for complete search history.

(56) References Cited

U.S. PATENT DOCUMENTS 6,761,966 B2    7/2004    Ito et al.
2003/0050430 A1    3/2003    Ito et al.
(Continued)

FOREIGN PATENT DOCUMENTS

EP    1 340 609 A2    9/2003
JP    07-053756 A    2/1995
(Continued)

OTHER PUBLICATIONS

Japanese Patent Office, International Search Report in International Patent Application No. PCT/JP2010/060022 (Jul. 13, 2010).
(Continued)

*Primary Examiner* — Ronak Patel
(74) *Attorney, Agent, or Firm* — Leydig, Voit & Mayer, Ltd.

(57) ABSTRACT

Disclosed is a void-containing heat-shrinkable polyester film which is composed of at least two layers, wherein at least one of the layers is a polyester resin layer comprising a cyclic polyolefin resin and containing voids. The film has an apparent specific gravity of less than 1.00 and has specified heat shrinking properties and mechanical properties. Also disclosed is a void-containing heat-shrinkable polyester film as mentioned above, which exhibits specified cuttability along a perforation. Further disclosed is a process for producing a void-containing heat-shrinkable polyester film as mentioned above.

15 Claims, 2 Drawing Sheets

(51) Int. Cl.
  *B29C 55/00* (2006.01)
  *B29C 55/02* (2006.01)
  *B29C 55/14* (2006.01)
  *B32B 27/08* (2006.01)
  *B32B 27/20* (2006.01)
  *B32B 27/32* (2006.01)
  *B32B 27/36* (2006.01)
  *C08L 67/02* (2006.01)
  *B29K 23/00* (2006.01)
  *B29K 67/00* (2006.01)
  *B29K 105/04* (2006.01)
  *C08L 23/02* (2006.01)

(52) U.S. Cl.
  CPC ......... *B29K2023/38* (2013.01); *B29K 2067/00* (2013.01); *B29K 2105/04* (2013.01); *B29K 2995/0049* (2013.01); *B32B 3/266* (2013.01); *B32B 27/08* (2013.01); *B32B 27/205* (2013.01); *B32B 27/325* (2013.01); *B32B 27/36* (2013.01); *B32B 2250/03* (2013.01); *B32B 2250/24* (2013.01); *B32B 2250/244* (2013.01); *B32B 2250/40* (2013.01); *B32B 2264/0257* (2013.01); *B32B 2270/00* (2013.01); *B32B 2305/026* (2013.01); *B32B 2305/30* (2013.01); *B32B 2307/412* (2013.01); *B32B 2307/518* (2013.01); *B32B 2307/54* (2013.01); *B32B 2307/5825* (2013.01); *B32B 2307/72* (2013.01); *B32B 2307/736* (2013.01); *B32B 2307/75* (2013.01); *B32B 2519/00* (2013.01); *C08L 23/02* (2013.01); *C08L 67/02* (2013.01)

USPC ................ 428/319.1; 428/304.4; 264/171.1

(56) References Cited

U.S. PATENT DOCUMENTS

| | | |
|---|---|---|
| 2003/0170476 A1 | 9/2003 | Murschall et al. |
| 2008/0311320 A1 | 12/2008 | Hiruma et al. |
| 2009/0042016 A1 | 2/2009 | Yoshida et al. |
| 2009/0227735 A1* | 9/2009 | Shih et al. ............... 525/54.21 |
| 2010/0143623 A1 | 6/2010 | Hiruma et al. |
| 2010/0209694 A1* | 8/2010 | Aoyama et al. ........... 428/317.9 |

FOREIGN PATENT DOCUMENTS

| | | | |
|---|---|---|---|
| JP | 10-058847 | A | 3/1998 |
| JP | 11-012377 | A | 1/1999 |
| JP | 2002-363312 | A | 12/2002 |
| JP | 2002-363321 | A | 12/2002 |
| JP | 2002-366312 | A | 12/2002 |
| JP | 2003-321562 | A | 11/2003 |
| JP | 2003-534948 | A | 11/2003 |
| JP | 2007-160635 | A | 6/2007 |
| JP | 2009-040045 | A | 2/2009 |
| WO | WO 2007/063973 | A1 | 7/2007 |
| WO | WO 2008/096798 | A1 | 8/2008 |
| WO | WO 2009/041448 | * | 4/2009 |

OTHER PUBLICATIONS

European Paten Office, Extended European Search Report in European Patent Application No. 10786265.8 (Jul. 19, 2013).

* cited by examiner

VOID-CONTAINING HEAT-SHRINKABLE POLYESTER FILM AND PROCESS FOR PRODUCTION THEREOF

TECHNICAL FIELD

The present invention relates to a void-containing heat-shrinkable polyester film, particularly to a heat-shrinkable polyester film suitable for labels. Further in detail, the invention relates to a void-containing heat-shrinkable polyester film for labels of PET bottles, which is easy to be torn well along perforations as a label when the label is peeled from a PET bottle, easy to be separated from water when the label is peeled from a PET bottle, scarcely causes problems in printing processing attributed to insufficient mechanical strength in the flow direction of a film formation apparatus (the direction orthogonal to the main shrinkage direction, which is the longitudinal direction of the film), and has excellent shrinkage finish properties.

BACKGROUND ART

As a heat-shrinkable film, particularly a heat-shrinkable film for a label on a bottle body part, films including polyvinyl chloride, polystyrene, or the like are mainly used. However, with respect to polyvinyl chloride, in these years, chlorine gas generation at the time of incineration for disposal becomes a problem and with respect to polystyrene, there is a problem that printing is difficult, and heat-shrinkable polyester films almost free from these problems have drawn attention. However, regarding the conventional heat-shrinkable polyester film, since almost no drawing is carried out in the longitudinal direction orthogonal to the main shrinkage direction, in the case where it is shrunk and coated on a PET bottle or the like as a label, there is a defect that a label cannot be torn well along perforations (in other words, poor perforation-tear property). Further, a polyester film has a specific gravity of about 1.4 and there is a problem that the film is difficult to be separated from a bottle by gravity separation in water when the film is used as a label.

Therefore, a void-containing heat-shrinkage polyester film has been investigated in order to improve perforation-tear property of the heat-shrinkage polyester film and also to adjust the apparent specific gravity of the heat-shrinkage polyester film to lower than 1.00. A method in which an incompatible thermoplastic resin is mixed in the main raw material of the heat-shrinkage polyester film is proposed (Patent Document 1).

Patent Document 1: Japanese Unexamined Patent Publication No. 2002-363312

SUMMARY OF THE INVENTION

Problems to be Solved by the Invention

According to the method in which a thermoplastic resin incompatible with polyester is mixed in the main raw material of the heat-shrinkage polyester film as disclosed in Patent Document 1, a void-containing heat-shrinkage polyester film can be produced by mixing a thermoplastic resin incompatible with polyester in the main raw material and the apparent specific gravity can be adjusted to lower than 1.00 by increasing the ratio of the thermoplastic resin incompatible with polyester.

However, in the case of uniaxial drawing in the width direction, which is a common method for producing a heat-shrinkable polyester film, the uniaxial drawing has to be carried out at such a high drawing ratio as to form voids sufficient to adjust the apparent specific gravity to lower than 1.00, and although the void content in the film becomes high, the mechanical strength of the film in the flow direction of a film formation apparatus (longitudinal direction of the film) is lowered and it results in occurrence of a problem that the film may not stand the tensile force applied to the film in the flow direction of a film formation apparatus at the time of printing process, and breakage or the like may be generated in some cases. Further, the productivity is limited in the case of the uniaxial drawing in the width direction and efficient heat-shrinkable polyester film production is not possible.

According to the method in which an incompatible thermoplastic resin is mixed in the main raw material of the heat-shrinkage polyester film like Patent Document 1, although the perforation-tear property of the heat-shrinkable polyester film is improved to some extent if a small amount of the incompatible thermoplastic resin is added in the main raw material of the heat-shrinkage polyester film, it cannot be necessarily said to obtain a heat-shrinkable polyester film with sufficient perforation-tear property by the uniaxial drawing in the width direction, which is a common method for producing a heat-shrinkable polyester film. On the other hand, it can be supposed to add the incompatible thermoplastic resin in the main raw material of the heat-shrinkage polyester film in large amount; however, although the perforation-tear property of the heat-shrinkable polyester film is improved, the film becomes poor in practical use due to considerable decrease of mechanical strength in a void-containing layer.

Also, the obtained film has merely a void-containing layer in which a thermoplastic resin incompatible with a polyester resin is mixed in the main raw material of the heat-shrinkage polyester film in order to improve the perforation-tear property and therefore, there is also a problem that it is difficult to obtain sufficient strength at the time of solvent adhesive of the films each other when the film is used as a label of a PET bottle or the like.

An object of the invention is to solve the problems that the conventional void-containing heat-shrinkable polyester film has, and to provide a void-containing heat-shrinkable polyester film with improved productivity, which has apparent specific gravity smaller than that of water and scarcely causes problems in printing processing attributed to insufficient mechanical strength in the longitudinal direction. Further, another object of the invention is to provide a void-containing heat-shrinkable polyester film with good perforation-tear property and mechanical strength, and also good solvent adhesive strength of the films each other at the time of producing a label.

Solutions to the Problems

The inventors of the invention have keenly studied to solve the above-mentioned problems and as a result, they have completed the invention at last. That is, the invention is configured as follows.

1. A void-containing heat-shrinkable polyester film comprising at least two layers, at least one layer of which is a polyester resin layer containing a cyclic polyolefin resin and having voids, the void-containing heat-shrinkable polyester film satisfying the following requirements (1) to (4):

(1) heat shrinkage in the main shrinkage direction is 40% or higher and 80% or lower when being treated in hot water at a treatment temperature of 90° C. for a treatment time of 10 seconds;

(2) heat shrinkage in the direction orthogonal to the main shrinkage direction is −2% or higher and 4% or lower when being treated in hot water at a treatment temperature of 80° C. for a treatment time of 10 seconds;

(3) apparent specific gravity is lower than 1.00; and (4) number of initial breakage, which is the number of breakage occurred at the time of 5% tensile, measured by repeating a tensile test with 10 times in the longitudinal direction while setting a distance between chucks of 100 mm and using a tensile tester after aging in an atmosphere of 30° C. and 85% RH for 672 hours is 4 times or lower.

2. A void-containing heat-shrinkable polyester film comprising at least one layer of a polyester resin layer containing a cyclic polyolefin resin and having voids, and a layer having no void laminated on the void-containing layer, the void-containing heat-shrinkable polyester film satisfying the following requirements (1) to (3), (5), and (6):

(1) heat shrinkage in the main shrinkage direction is 40% or higher and 80% or lower when being treated in hot water at a treatment temperature of 90° C. for a treatment time of 10 seconds;

(2) heat shrinkage in the direction orthogonal to the main shrinkage direction is −2% or higher and 4% or lower when being treated in hot water at a treatment temperature of 80° C. for a treatment time of 10 seconds;

(3) apparent specific gravity is lower than 1.00;

(5) tear propagation resistance in the direction orthogonal to the main shrinkage direction after 10% shrinkage in the main shrinkage direction is 100 mN or higher and 500 mN or lower and/or right-angled tear strength is 100 N/mm or higher and 300 N/mm or lower; and (6) solvent adhesive strength is 4N/15 mm width or higher and 10 N/15 mm width or lower.

3. The void-containing heat-shrinkable polyester film as referred in 1 or 2, wherein the average value of the void height in a cross section cut in the width direction at an arbitrary position is 2.0 μm or higher.

4. The void-containing heat-shrinkable polyester film as referred in 1 or 2, wherein the maximum value of the heat shrinkage stress in hot air at 90° C. is 10 MPa or lower.

5. The void-containing heat-shrinkable polyester film as referred in 1 or 2, wherein a content of the cyclic polyolefin resin as an essential component is 5 to 20% by mass in the entire film weight and a total content of resins incompatible with a polyester resin is 10 to 20% by mass in the entire film weight.

6. The void-containing heat-shrinkable polyester film as referred in 1 or 2, wherein the film has at least one layer of a layer containing titanium oxide.

7. The void-containing heat-shrinkable polyester film as referred in 1, wherein the solvent adhesive strength is 4N/15 mm width or higher and 10 N/15 mm width or lower.

8. A process for producing a void-containing heat-shrinkable polyester film comprising at least two layers, at least one layer of which is a polyester resin layer containing a cyclic polyolefin resin and having voids, the process comprising the following steps (a) to (e):

(a) a lengthwise drawing step of drawing an undrawn film at a temperature of 75° C. or higher and 100° C. or lower by 1.1 times or higher and 1.8 times or lower in the longitudinal direction;

(b) an intermediate heat treatment step of heat-treating the film after the lengthwise drawing at a temperature of 110° C. or higher and 150° C. or lower for 5 seconds or more and 30 seconds or lower in a state of holding both ends in the width direction by clips in a tenter;

(c) a positive cooling step of positively cooling the film after the intermediate heat treatment until the surface temperature becomes a temperature of 70° C. or higher and 90° C. or lower;

(d) a transverse drawing step of drawing the film after the positive cooling at a temperature of 65° C. or higher and 85° C. or lower by 3.5 times or higher and 5.0 times or lower in the width direction; and (e) a final heat treatment step of heat treating the film after the transverse drawing at a temperature of 80° C. or higher and 100° C. or lower for 5 seconds or more and 30 seconds or lower in a state of holding both ends in the width direction by clips in a tenter.

9. The process for producing a void-containing heat-shrinkable polyester film as referred in 8, further comprising the following step (f):

(f) an extrusion step of discharging a molten resin under conditions that a shear velocity of a polymer flow in dies at the time of obtaining the undrawn film is 100 sec$^{-1}$ or higher and a draft ratio is 12 or higher.

Effects of the Invention

According to the invention, it is made possible to add voids with high height in a film, to adjust the specific gravity to lower than 1.00, and to provide a void-containing heat-shrinkage polyester film which has high strength in the machine flow direction, scarcely causes a breakage problem on the tensile force in the longitudinal direction of the film received at the time of printing, and is thus tough.

Further, the void-containing heat-shrinkable polyester film of the invention has low heat shrinkage stress while keeping high shrinkable property in the width direction, which is the main shrinking direction, and is thus excellent in shrinkage finish properties at the time of processing the film into a label. Further, in the production condition where the shear velocity of the polymer flow in dies and the draft ratio are high at the time of obtaining a undrawn film, conventionally, the dispersion diameter (relates to the height of void) of a resin incompatible with a polyester resin and polyester becomes small and thus it becomes difficult to form voids with high height at the time of drawing; however, in the invention, it is made possible to efficiently produce voids with high height even in the production condition where the shear velocity of the polymer flow in dies and the draft ratio are high and to easily adjust the apparent specific gravity to lower than 1.00 by using a cyclic polyolefin resin with high viscosity and high stiffness so as not to make the dispersion diameter of a resin incompatible with the polyester in the undrawn film small. Consequently, gravity separation of the film used as a label from a PET bottle in water is made easy.

Further, according to the invention, voids with high height can be contained in the film and owing to the presence of the void-containing layer, excellent perforation-tear property is exhibited and moreover, the film is provided with excellent solvent adherability and mechanical strength by laminating a solvent adhesive layer free from voids on the void-containing layer.

The void-containing heat-shrinkable polyester film of the invention has a light shielding property without being printed or processed (of course, the light shielding property can be further heightened by being printed or processed) and also excellent solvent adherability and therefore, the film can be used preferably as various kinds of coating labels such as labels for PET bottles or the like.

MODE FOR CARRYING OUT THE INVENTION

Figure 1:
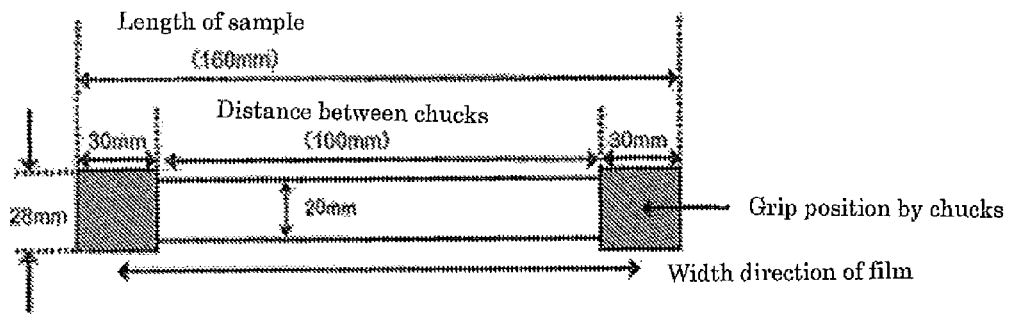
FIG. 1 A schematic drawing showing a specimen for measuring heat shrinkage stress.
Figure 2:
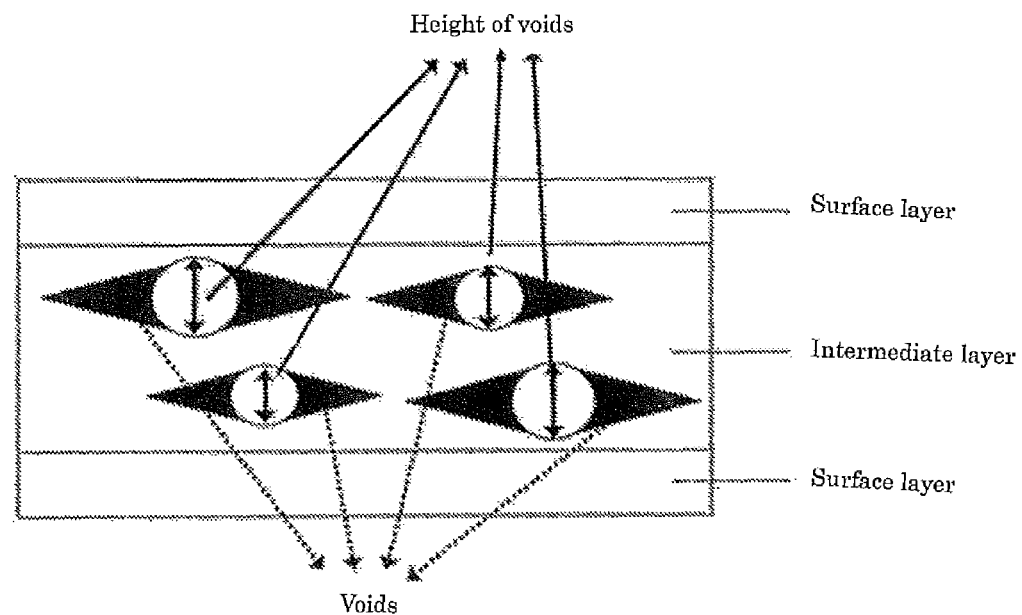
FIG. 2 A schematic drawing showing one example (example of a film with a trilayer structure of two kind materials) of a cross section of a film for showing the position of measuring the height of voids.

Hereinafter, the embodiments of the present invention will be specifically described.

Regarding the heat-shrinkable polyester film of the invention, its undrawn film can be obtained by melt-extruding a polyester composed of a dicarboxylic acid component and a polyhydric glycol component by an extruder and forming a film by cooling the extruded product with a conductive cooling roll (a casting roll or the like).

At the time of the extrusion, in order to provide the film with as necessary heat shrinkage property, it is preferable to extrude a copolymer polyester alone or a plurality of polyesters (copolymer polyesters or homopolyesters) while mixing them. That is, the film contains a base unit (a crystalline unit of polyethylene terephthalate or the like) and a second alcohol component which is different from the polyhydric glycol component (ethylene glycol component or the like) constituting the base unit and which provides amorphousness to the film. A main acid component constituting the base unit is preferably terephthalic acid and a main diol component is preferably ethylene glycol. In addition, the contents of the acid component and the diol component of the invention represent contents of the acid component and the diol component to the total of the polyesters in the case of two or more kinds of polyester polymers are used in combination. It does not matter whether interesterification is carried out or not after the mixing.

When a polyester film containing the second alcohol component other than ethylene glycol is drawn, a heat-shrinkable polyester film can be obtained easily.

Those usable as the second alcohol component for providing amorphousness are a diol component and a trihydric or more alcohol component. Diol components include alkylene glycols such as ethylene glycol, 1,3-propanediol, 1,4-butanediol, 2,2-diethyl-1,3-propanediol, 1,6-hexanediol, 3-methyl-1,5-pentanediol, 2-methyl-1,5-pentanediol, 1,9-nonanediol, and 1,10-decanediol, cyclic alcohols such as 1,4-cyclohexanedimethanol, ether glycols such as diethylene glycol, triethyleneglycol, polypropyleneglycol, polyoxytetramethyleneglycol, and alkylene oxide adduct of bisphenol compound or its derivatives, and dimer diol. Trihydric or more alcohols include trimethylolpropane, glycerin, pentaerythritol and the like.

The polyester preferably has 14% by mole or more of the sum of at least one monomer capable of forming an amorphous component in 100% by mole of the polyhydric alcohol component in the whole polyester resin, more preferably 16% by mole or more, furthermore preferably 18% by mole or more. Here, as a monomer capable of forming an amorphous component, there can be listed neopentylglycol, 1,4-cyclohexanedimethanol, and the like.

The above-mentioned polyesters can all be produced by polymerization through conventional methods. For example, the polyesters can be obtained by a direct esterification method of causing direct reaction of a dicarboxylic acid and a diol and an interesterification method of causing reaction of a dicarboxylic acid dimethyl ester and a diol. The polymerization may be carried out either in batch way or in continuous way.

Further, in order to produce a heat-shrinkable polyester film excellent especially in shrinkage finish property and to improve the shrinkage finish property even at high heat shrinkage, the amount of neopentylglycol or cyclohexanedimethanol component is preferably 14% by mole or higher, more preferably 16% by mole or higher, and even more preferably 18% by mole or higher in 100% by mole of the polyhydric alcohol component in the entire polyester resin as described above. The upper limit of the component is not particularly limited; however, if the amount of the component is too large, the heat shrinkage may excessively become too high or the breakage resistance of the film may be worsened in some cases and therefore, it is preferably 40% by mole or lower, more preferably 35% by mole or lower, and even more preferably 30% by mole or lower.

In order to satisfy the shrinkage finish property, it is also preferable to adjust the content of a polyester elastomer to 3% by mass or higher. Herein, the polyester elastomer is, for example, a polyester block copolymer composed of a high melting point crystalline polyester segment (Tm 200° C. or higher) and a low melting point soft polymer segment (Tm 80° C. or lower) with a molecular weight of 400 or higher, preferably 400 to 800, and examples thereof include polyester elastomers using a polylactone such as poly-ε-caprolactone as the low melting point soft polymer segment. Further, the shrinkage in the direction orthogonal to the main shrinkage direction can be within a proper and low range by adjusting the polyester elastomer in the above-mentioned range and combining it with a preferable production method and conditions as described below.

In a polyester, it is preferable not to contain linear diols having 8 or more carbon atoms (for example, octanediol etc.) or polyhydric alcohols of trihydric or more (for example, trimethylolpropane, trimethylolethane, glycerin, diglycerine etc.). A heat-shrinkable polyester film obtained by using polyester containing these diols or polyhydric alcohols tends to decrease heat shrinkage of main shrinkage direction.

Further, in a polyester, it is preferable not to contain diethylenglycol, triethyleneglycol and polyethyleneglycol as far as possible. Particularly, diethyleneglycol tends to be present since it is a byproduct component at the time of polyester polymerization; however, the content of diethylene glycol is preferably less than 4% by mole in the polyester to be used in the invention.

In the invention, in order to provide a film with light shielding property by adjusting the whole light transmittance of the film within a specified low range, particles such as inorganic particles or organic particles are added to the film in an amount of preferably 0.1 to 20% by mass and more preferably 1 to 15% by mass based on the film mass. In the case where the content of the particles is less than 0.1% by mass, it tends to be difficult to obtain, for example, sufficient light shielding property and it is therefore not preferable. On the other hand, if it exceeds 20% by mass, the film strength is lowered and film formation tends to be difficult and it is therefore not preferable.

The particles may be added before polyester polymerization but generally added after polyester polymerization. Examples of the inorganic particles to be added include known inactive particles of kaolin, clay, calcium carbonate, silicon oxide, calcium terephthalate, aluminum oxide, titanium oxide, calcium phosphate, carbon black, etc.; high melting point organic compounds insoluble at the time of melt-film formation of polyester resins; crosslinked polymers; and inner particles formed in the polymers at the time of producing a polyester from metal compound catalysts, for example, alkali metal compounds and alkaline earth metal compounds to be used at the time of synthesis of a polyester. Above all, titanium oxide particles are preferable from the viewpoint of efficiently providing light shielding property.

The average particle diameter of the above-mentioned particles contained in the film is in a range of 0.001 to 3.5 μm. Herein, the average particle diameter of the particles is measured by a Coulter Counter method. The average particle diameter of the particles is preferably 0.001 μm or larger and 3.5 μm or smaller, and more preferably 0.005 μm or larger and 3.0 μm or smaller. If the average particle diameter of the particles is smaller than 0.001 μm, it becomes difficult to obtain, for example, the light shielding property and therefore it is not preferable. If the average particle diameter of the particles exceeds 3.5 μm, the film surface becomes inferior in the smoothness and an inconvenient consequence such as missing of printing may be occurred and it is not therefore preferable. The average particle diameter of anatase type titanium oxide particles is generally 2.0 μm or smaller and the average particle diameter of rutile type titanium oxide particles is generally 2.0 μm or larger. In order to shield visible light, the average particle diameter of 2.0 to 3.0 μm is most efficient and rutile type titanium oxide particles generally have higher shielding property than anatase type titanium oxide particles.

Titanium oxide particles can be classified into crystal forms; anatase form and rutile form. Both are used for kneading with plastics. The anatase form tends to cause yellowing or deterioration of resins by direct sunlight or the like, and in the case of outdoor use, the surface of titanium oxide is often subjected to special treatment (with alumina, silica, organics, etc.) or rutile form is often selected.

In the invention, in order to suppress the apparent specific gravity of the void-containing layer of the film to be about 0.6 and to adjust the apparent specific gravity of the entire film to lower than 1.00, it is preferable, for example, to form fine voids in the inside. A preferable method is for obtaining voids by mixing an incompatible thermoplastic resin in a polyester and drawing the resultant product in at least uniaxial direction. However, in the production condition where the shear velocity of the polymer flow in dies and the draft ratio are high, if the melt viscosity and hardness of the resin incompatible with a polyester is low, the dispersion diameter becomes small at the time of extrusion molding and the number of voids formed in the film inside in the following drawing step becomes insufficient. Consequently, in the production condition where the shear velocity of the polymer flow in dies and the draft ratio are high, the thermoplastic resin incompatible with a polyester is preferable to have high melt viscosity and hardness. According to the results of experiments carried out by the inventors of the invention, it is found that a cyclic polyolefin is most preferable as the thermoplastic resin incompatible with a polyester. Regarding a cyclic polyolefin, a resin having high viscosity and high hardness can be obtained by increasing the content of the cyclic polyolefin in the resin. Specific examples of the resin incompatible with a polymer other than the above resins include polyolefin resins, polystyrene resins, polyacrylic resins, polycarbonate resins, polysulfone resins, and cellulose resins, and these may be used in combination with a cyclic olefin. Above all, although the polystyrene resins by themselves have low melt viscosity and therefore cannot be said to be preferable, the resins have good compatibility with a cyclic polyolefin and are provided with high melt viscosity in combination use with a cyclic polyolefin and are accordingly preferable.

The content of a resin incompatible with a polyester is preferably in a range of 10 to 20% by mass in terms of film. If the content of the incompatible resin is less than 10% by mass, for example, the number of voids formed in the film inside becomes low and the effect to lower the apparent specific gravity tends to be insufficient and therefore, it is not preferable. If the content of the incompatible resin exceeds 20% by mass, for example, the kneading in the extrusion step becomes uneven and it becomes difficult to obtain a stable film and therefore, it is not preferable.

Specific examples of the cyclic polyolefin include thermoplastic resins containing (1) polymers obtained by hydrogenating ring-opened copolymers of cyclic olefins, based on necessity; (2) addition (co)polymers of cyclic olefins; and (3) random copolymers of cyclic olefins and α-olefins such as ethylene and propylene; and also graft-modified products obtained by modifying the (1) to (3) into unsaturated carboxylic acids or their derivatives.

Specific examples of the cyclic polyolefins include those having norbornene as a main structure and their derivatives, those having tetracyclododecene (tetracyclo-3-dodecene) as a main structure and their derivatives. Examples of the norbornene derivatives include bicyclohept-2-ene (2-norbornene) and its derivatives, 6-methylnorbornene, 6-ethylnorbornene, 5-propylnorbornene, 6-n-butylnorbornene, 1-methylnorbornene, 7-methylnorbornene, 5,6-dimethylnorbornene, 5-phenylnorbornene, and benzylnorbornene. In addition, as a norbornene resin, TOPAS (registered trade name) manufactured by Polyplastics Co., Ltd. is preferably usable. On the other hand, examples of the tetracyclododecene derivatives include 8-methyltetracyclo-3-dodecene, 8-ethyltetracyclo-3-dodecene, and 5,10-dimethyltetracyclo-3-dodecene. In addition, as a tetracyclododecene resin, APEL (registered trade name) manufactured by Mitsui Chemicals Inc., ARTON (registered trade name) manufactured by JSR Co., Ltd., and ZEONOR (registered trade name) and ZEONEX (registered trade name) manufactured by Nippon Zeon Co., Ltd. are preferably usable.

A cyclic polyolefin resin generally has a glass transition temperature of −20 to 400° C., and the cyclic polyolefin resin to be used preferably in the invention has a glass transition temperature of preferably 100 to 230° C., and more preferably 150 to 200° C. If the glass transition temperature is lower than 100° C., Tg may possibly be lower than the temperature at the time of drawing of an undrawn film and foaming becomes hard at the time of drawing the film and therefore, it is not preferable. On the other hand, if Tg is higher than 230° C., uniform mixing with a polymer in an extruder becomes difficult and the properties of films become uneven and therefore, it is not preferable.

The cyclic polyolefin resin is preferably contained in 5 to 20% by mass based on the total film mass. That is, as described above, the weight of the entire resins incompatible with a polyester resin is preferably 10 to 20% by mass in the entire film weight, and it means that the cyclic polyolefin resin is preferable to be contained in an amount of 5 to 20% by mass in the entire film mass, and that it may be allowed to contain other resins incompatible with a polyester resin such as a polystyrene resin described below in an amount of 15% by mass or lower in the entire film mass. In this connection, it means that the total content of the resin including a cyclic polyolefin resin and incompatible with a polyester resin is preferably 20% by mass or lower, and that if the content of the cyclic polyolefin resin is 10% by mass or more in the entire film mass, there may be no need to contain a resin incompatible with a polyester resin other than the cyclic polyolefin resin. As described before, the resins incompatible with a polyester resin are contained in a weight of 10% by mass or more in the entire film weight because the specific gravity of the film can reliably be adjusted to less than 1.00.

The polystyrene resin refers to a thermoplastic resin containing a polystyrene structure as a base constituent, and examples thereof include in addition to homopolymers such as atactic polystyrene, syndiotactic polystyrene and isotactic polystyrene, modified resins which are graft- or block-copolymerized with other components, for example, an impact-resistant polystyrene resin, a modified polyphenylene ether resin and the like, further, a mixture with a thermoplastic resin compatible with these polystyrene resins, for example, polyphenylene ether.

In preparing a polymer mixture obtained by mixing with the above-described incompatible resin with polyester, for example, chips of each resin may be mixed and melt-kneaded inside an extruder, then extruded, or those obtained by previously kneading both resins with a kneading machine may be further melt-extruded from an extruder. Further, a polystyrene resin is added in a polymerization process of polyester, and the chip obtained by stirring and dispersion may be melt-extruded.

It is preferable to provide a layer A containing substantially no void other than a layer B containing a large number of voids in the inside of the film in the invention. In order to make this configuration, raw materials A and B are loaded separately to different extruders, molten, stuck to each other in a molten state before being subjected to a T-die or in the die, and cooled by a conductive cooling roll (a casting roll or the like) to form a film (an undrawn film).

The drawing is preferable to be biaxial drawing. If the drawing is only uniaxial drawing in the width direction, in the case where the apparent specific gravity of the film becomes lower than 1.00, the mechanical strength in the longitudinal direction is lowered and it results in a cause of occurrence of problems on processing such as printing. Therefore, in order to keep the apparent specific gravity of the film lower than 1.00 and the mechanical strength in the longitudinal direction, drawing in both longitudinal direction and width direction is preferable. Further, it is particularly preferable to provide the layer B containing a large number of voids as an intermediate layer in the inside of the film of the invention and the layer A containing no void as both surface layers. In this case, it is preferable that the layer A contains no incompatible resin as a raw material. This makes it possible to be free from voids in the layer A, to prevent undesirable curl to be generated, and to be easily prone to smoothness in the film surface and consequently, the film can be provided with improved printability and keep strength after printing. Further, since there is no void, the stiffness of the film is not lowered and the film becomes excellent in attachable property. Furthermore, formation of voids has a function of lowering the shrinkage so that high heat shrinkage can be obtained by providing a void-free layer.

Furthermore, based on necessity, additives such as a stabilizer, a coloring agent, an antioxidant, a defoaming agent, an antistatic agent, an ultraviolet absorbent, etc. may be added. Additionally, in order to improve the whiteness of the film, a fluorescent brightener may be added.

As a polymerization catalyst, various kinds of commonly used catalysts can be used and examples thereof include aluminum-based catalysts, titanium-based catalysts, antimony-based catalysts, germanium-based catalysts, tin-based catalysts, cobalt-based catalysts, and manganese-based catalysts; preferably titanium-based catalysts (titanium tetrabutoxide, etc.), antimony-based catalysts (antimony trioxide, etc.), germanium-based catalysts (germanium dioxide, etc.), and cobalt-based catalysts (cobalt acetate, etc.).

The void-containing heat-shrinkable polyester film of the invention is treated in hot water at 90° C. for 10 seconds in a no-load state and the heat shrinkage in the width direction of the film calculated from the length before and after the shrinkage according to the equation: heat shrinkage=((length before shrinkage−length after shrinkage)/(length before shrinkage)×100(%) is preferably 40% or higher and 80% or lower. The lower limit is more preferably 55% or higher and furthermore preferably 60% or higher. The upper limit is more preferably 75% or lower and furthermore preferably 70% or lower.

In the case where the hot water heat shrinkage in the width direction at 90° C. is lower than 40%, insufficient shrinkage of a label occurs in the narrow portion of a bottle and therefore, it is not preferable. On the other hand, in the case where it exceeds 80%, since the shrinkage is significant large and because of that, an inconvenient consequence, for example, jumping up of a label at the time of shrinkage treatment occurs and therefore, it is not preferable. In addition, the reason for employing a temperature of 90° C. is because its evaluation is often carried out at a temperature relatively close to boiling point of water, 100° C., in the case where customers inquire about the maximum heat shrinkage potential of a film, assuming attachment treatment of a label is to be carried out in a steam tunnel or the like.

When the void-containing heat-shrinkable polyester film of the invention is treated in hot water at 80° C. for 10 seconds, the heat shrinkage of the film in the longitudinal direction is preferably −2% or higher and 4% or lower. The lower limit is more preferably −1.5% or higher and furthermore preferably −1% or higher. The upper limit is more preferably 3% or lower and furthermore preferably 2% or lower.

In the case where the hot water heat shrinkage in the longitudinal direction at 80° C. is lower than −2% (namely, a film extend beyond 2% by heat treatment), it is not preferable because a good shrinkage appearance cannot be obtained when used as a label of a bottle. On the other hand when the heat shrinkage is more than 4%, it is not preferable because strain in shrinkage at heat shrinkage tends to occur when used as a label. The reason for employing a temperature of 80° C. is because the level of undesirable heat shrinkage (or heat extention) in the direction orthogonal to the main shrinkage direction should be confirmed at a temperature close to the actual film temperature in the case of actual treatment in a steam tunnel.

The maximum value of the heat shrinkage stress in hot air at 90° C. and in the main shrinkage direction of the void-containing heat-shrinkable polyester film of the invention is preferably 10 MPa or lower and more preferably 4 MPa or higher and 10 MPa or lower. If the maximum value of the heat shrinkage stress is below 4 MPa, depending on the shape of a container, the adhesion of a label to the bottle becomes insufficient after shrinkage of the label and a problem that the label is also turned around at the time of opening a cap tends to occur easily and therefore, it is not preferable. On the other hand, if the maximum value of the heat shrinkage stress exceeds 10 MPa, abrupt shrinkage is caused and an inconvenient consequence such as jumping up or wrinkles tends to occur easily and therefore, it is not preferable.

The average value of the height of the respective voids in a cross section in the width direction at an arbitrary position perpendicular to the film surface of the void-containing heat-shrinkable polyester film of the invention is preferably 2.0 µm or higher. If the average value of the height of the voids is lower than 2.0 µm, it becomes difficult to lower the apparent specific gravity. If the average value of the height of the voids is 6.0 μm or higher, there is a problem of occurrence of breakage or the like at the time of film formation and therefore, it is not preferable.

The void-containing heat-shrinkable polyester film of the invention is preferable to have an apparent specific gravity of lower than 1.00. The fact that the apparent specific gravity is low and the film is lightweight is a considerable advantage in mass production, and in the case where the apparent specific gravity of the film is lower than 1.00, it becomes easy to separate a bottle and a label by gravity separation in water at the time of using the film as a label of a PET bottle. It is more preferably 0.95 or lower and furthermore preferably 0.90 or lower. However, if the apparent specific gravity is too low, the film strength is easily lost and therefore, the apparent specific gravity is preferable to be 0.75 or higher. It is furthermore preferably 0.80 or higher.

In the void-containing heat-shrinkable polyester film of the invention, the number of initial breakages in the film longitudinal direction is preferably not more than 4 after the heat-shrinkable polyester film is stored under the atmosphere of 30° C. and a relative humidity of 85% for 672 hours (four weeks). The number of initial breakages is as follows: when, for a plurality of film test pieces after being stored under the above-described conditions, is subjected to a tensile test in the direction orthogonal to the main shrinkage direction under the conditions of a test piece length of 140 mm, a distance between chucks of 100 mm, a test piece width of 15 mm, a temperature of 23° C. and a tensile speed of 200 mm/min, the number of tests in which a breakage occurs at a breaking elongation of 5% or less out of 10 times of tensile tests repeated. In the case that the number of initial breakages is more than 5, when the tensile force applied to the film at the time of processing such as printing, possibility of generating breakage becomes high, and therefore it is not preferable. The number of initial breakages is more preferably not more than 4, and further preferably not more than 2 and zero is most preferable.

In the heat-shrinkable white polyester film of the invention, tear propagation resistance per unit thickness in the longitudinal direction after being shrunk by 10% in the width direction in hot water at 80° C. is preferably 100 mN or higher and 500 mN or lower. If the tear propagation resistance after being shrunk by 10% in the width direction in hot water at 80° C. is less than 100 mN, tearing along perforation becomes difficult and therefore, it is not preferable. It is more preferably 230 mN or higher. Contrarily, if the tear propagation resistance exceeds 500 mN, cutting property (easiness of tearing) becomes inferior at the time of tearing a label and therefore, it is not preferable. It is more preferably 420 mN or lower.

Further, in the heat-shrinkable white polyester film of the invention, when right-angled tear strength per unit thickness in the longitudinal direction after being shrunk by 10% in the width direction in hot water at 80° C., the right-angled tear strength per unit thickness in the longitudinal direction is preferable 100 N/mm or more and 300 N/mm or less. When the right-angled tear strength after being shrunk by 10% in the width direction in hot water at 80° C. is less than 100 N/mm, a situation in which the film is easily torn by an impact such as falling during transportation is possibly caused when the film is used as a label, whereby the case is unpreferred. More preferably 140 N/mm or more. Conversely, when the right-angled tear strength is more than 300 N/mm, it is not preferable because cutting property (easiness of tearing) become bad at an early stage of tearing a label. More preferably 260 N/mm or less.

The thickness of the void-containing heat-shrinkable polyester film of the invention is not particularly limited; however it is preferably 30 μm or thicker and 50 μm or thinner, assuming use of the film as a heat-shrinkable film for a label. In addition, the thickness of the respective constitution of the void-containing heat-shrinkable polyester film of the invention is not particularly limited; however it is preferably 2 μm or thicker in each constitution.

In order to satisfy the above-mentioned properties, the film of the invention preferably has a layer structure of MB, A/B/A, or A/B/C. The thickness ratio B/A of the layer A and the layer B is preferably 2/1 or higher and more preferably 3/2 or higher. If B/A is lower than 1/1, it becomes difficult to satisfy both of the apparent specific gravity and the appearance. The trilayer structure of two kind materials, A/B/A, is particularly preferable in terms of suppression of curl after shrinkage treatment.

The whole light transmittance of the void-containing heat-shrinkable polyester film of the invention is preferably 40% or lower. If it exceeds 40%, the contents are seen through or the printed matter is hard to be seen and the appearance may become inferior in some cases and therefore, it is not preferable. The whole light transmittance is preferable to be close to 0%; however, if it is lower than 40%, the light shielding effect can be caused.

The heat-shrinkable polyester film of the invention preferably has solvent adhesive strength of 4N/15 mm width or more. When the solvent adhesive strength is less than 4N/15 mm width, it is not preferable because it tends to peel from a solvent-bonded part after heat shrinkage of the label. Additionally, the higher the solvent adhesive strength, the better, but it is considered that the upper limit of the solvent adhesive strength is about 10 (N/15 mm) from performance of a film forming equipment. When the solvent adhesion strength is too high, in bonding two films with a solvent to form a label, a situation that the film is bonded to an unnecessary film tends to occur, and the productivity of the label is sometimes lowered. Thus, the solvent adhesion strength may be not more than 7 (N/15 mm) in view of practical use. In order to attain the above-mentioned solvent adhesive strength, it is preferable to use a polyester containing a specified amount of an amorphous component for a layer positioned in the surface layer and to make the surface layer substantially free from voids and the film surface smooth.

Next, a specific example of a process for producing a void-containing heat-shrinkable polyester film of the present invention will be described; however the invention should not be limited to the production process.

Polyester raw materials to be used in the invention are dried by a drier such as a hopper drier or a paddle drier, or a vacuum drier, molten at a temperature of 200 to 300° C., and extruded into a film-like shape. At the time of the extrusion, any existing method such as a T die method or a tubular method may be used. After the extrusion, quenching is carried out to obtain an undrawn film.

With respect to the extrusion temperature, it is preferable to be carried out in a range of 250° C. to 290° C. If the extrusion temperature is lower than 250° C., for example, the load is too high and normal extrusion becomes difficult. If the extrusion temperature exceeds 290° C., it results in occurrence of inconvenient consequences such that the polyester resin tends to be thermally deteriorated in an extruder, the mechanical strength of the film to be obtained is lowered, and the lengthwise shrinkage shows excess minus value and the shrinkage finish property is lowered.

It is preferable that the average value of the height of the voids is kept to be 2.0 μm or higher even if the shear velocity at the outlet of dies is 100 (sec-1) or higher and the draft ratio is 12 or higher in the case of obtaining an undrawn film. The shear velocity and the draft ratio are advantageous to be smaller in order to lower the apparent specific gravity. However, if the shear velocity is low, the amount of a resin extruded is decreased and the productivity is worsened. Also, if the draft ratio is low, the production speed becomes slow and the productivity is worsened. Further, if the speed in the step of producing an undrawn film for obtaining a drawn film with a thickness of 30 μm to 50 μm is increased to 50 (m/min) or higher, the draft ratio inevitably becomes high.

The shear velocity at the outlet of dies and the draft ratio are calculated according to the following Equations (1) and (2).

Shear Velocity $$\gamma = 6Q/(W \times H2) \quad \text{Equation (1)}$$

γ; shear velocity (sec-1)
Q; amount of raw material discharged from extruder (cm³/sec)
W; width of aperture part of outlet of dies (cm)
H; Lip gap of dies (cm)

Draft Ratio $$\text{Draft ratio} = Vf/Vl \quad \text{Equation (2)}$$

Vf; velocity of resin at Lip outlet of dies (cm/sec)
Vl; pulling velocity of cooling drum (cm/sec)

In the above-mentioned high ranges of the shear velocity and the draft ratio, the voids become flat if an incompatible resin is merely mixed to a polyester without any devisal and the height of the voids in the thickness direction of the film becomes low and thus the apparent specific gravity cannot be sufficiently lowered. Accordingly, the inventors of the invention have made investigations on an incompatible resin which can give an average height value of voids in the thickness direction of the film of 2.0 μm or higher even if a high shear velocity and a high draft ratio, by the following means. In order to produce a film with large voids in production condition where the shear velocity of the polymer flow in dies and the draft ratio are high, it is preferable to widen the dispersion diameter of the incompatible resin in the undrawn film. For this purpose, among resins incompatible with a polyester, an incompatible resin with high viscosity and high strength (high flexural modulus) is preferable. Based on the results of the experiments carried out by the inventors of the invention, the viscosity is preferably 20 g/min or lower based on MFR. It is more preferable as MFR is lower, actually, the lower limit is 0.1. The hardness is preferably 2000 MPa or higher based on flexural modulus. It is more preferable as the flexural modulus is higher; however, it is too high, breakage tends to be caused easily at the time of drawing and the productivity is worsened and therefore, it can be said that the upper limit is generally 6000 MPa. As a matter of course, it is preferable to add the incompatible resin as described above to the layer B of the layer structure of such as layer A/layer B/layer A.

The undrawn film obtained is drawn in the longitudinal direction under a predetermined condition as described below, and the film after lengthwise drawing is quenched, and then heat-treated once, the film after the heat treatment is cooled in a predetermined condition, and then drawn in the width direction under a predetermined condition, and heat-treated once again, thereby obtaining a heat-shrinkable white polyester film of the invention. Hereinafter, a preferable film forming method to obtain a heat-shrinkable white polyester film of the first invention is described in detail by considering the difference from the film forming method of the conventional heat-shrinkable polyester film.

As described above, traditionally, a heat-shrinkable polyester film was produced by drawing an undrawn film only in a direction to be shrunk (namely, main shrinkage direction, ordinarily width direction). The present inventors have studied on the conventional production method, and as a result, it has been found that there are the following problems in production of the conventional heat-shrinkable polyester film.

In the case of film formation of a void-containing film with an apparent specific gravity of less than 1.00 in order to improve the perforation-tear property, if the drawing is simply in the width direction when the void-containing film with an apparent specific gravity of less than 1.00 is formed, the mechanical strength in the longitudinal direction is lowered and it results in occurrence of a problem of breakage or the like at the time of printing processing. Moreover, it is difficult to increase the line speed of a film formation apparatus.

In the case of adopting a method of drawing in the longitudinal direction after drawing in the width direction, using any drawing condition cannot sufficiently exhibit shrinkage force in the width direction. Furthermore, it exhibits shrinkage force in the longitudinal direction at the same time, so that finishing after being shrunk and attached as a label becomes bad.

In the case of adopting a method of drawing in the width direction after drawing in the longitudinal direction, although it can exhibit shrinkage force in the width direction, it exhibits shrinkage force in the longitudinal direction at the same time, so that finishing after being shrunk and attached as a label becomes bad.

Moreover, based on the problems in the above-mentioned conventional production of heat-shrinkable polyester films, the inventors of the invention have made further investigations to obtain a void-containing heat-shrinkable polyester film with improved productivity, which has an apparent specific gravity of lower than 1.00 and high mechanical strength in the longitudinal direction, and as a result, the inventors presently assume the following.

In order to give good mechanical strength in the longitudinal direction at the time of using as a label, it is supposed to be necessary that some of molecules oriented in the longitudinal direction are left, for that purpose, it is considered that the state of tension of molecules oriented in the longitudinal direction need to be cancelled out.

In order to give good finishing after shrinkage-attachment at the time of using as a label, it is essential not to exhibit shrinkage force in the longitudinal direction, therefore it is considered that the state of tension of molecules oriented in the longitudinal direction need to be canceled out.

Then, the inventors of the invention have reached a conclusion that in order to satisfy that the apparent specific gravity is lower than 1.00; that the mechanical strength in the longitudinal direction is good; and that the perforation-tear property of a label is improved simultaneously from the above-mentioned knowledge, "molecules not contributed to shrinkage force while being oriented in the longitudinal direction" needs to be present in a film. Then, they have paid attention on how to carry out drawing in order for "molecules not contributed to shrinkage force while being oriented in the longitudinal direction" to be able to be present in a film and had a trial and error. As a result, they have reached the invention based on the following: drawing is carried out in the width direction after drawing is carried out in the longitudinal direction, what is called, in production of a film by a lengthwise-transverse drawing method, by conducting the following means, "molecules not contributed to shrinkage force while being oriented in the longitudinal direction" to be present in a film can be realized, thereby to obtain a void-containing heat-shrinkable polyester film having an apparent specific gravity of lower than 1.00, good mechanical strength in the longitudinal direction, and good perforation-tear property when used as a label.

(1) Control of lengthwise drawing condition
(2) Intermediate heat treatment after lengthwise drawing
(3) Forced cooling of film after intermediate heat treatment
(4) Control of transverse drawing condition Hereinafter, each means described above is described sequentially.

(1) Control of Lengthwise Drawing Condition

In producing a film by the lengthwise and transverse drawing method in the invention, in order to obtain the film roll of the invention, it is preferable that in a lengthwise drawing process of substantively one step in the longitudinal direction alone at a temperature of 75° C. or more and 100° C. or less, lengthwise drawing is conducted by a relatively low ratio of 1.1 times or more and 1.8 times or less.

If the drawing temperature is lower than 75° C., the orientation in the lengthwise direction becomes too high and at the time of transverse drawing in the next step, breakage tends to occur easily and therefore, it is not preferable. On the other hand, if the drawing temperature is over 100° C., the film is molten on a drawing roll and the drawing becomes difficult and therefore, it is not preferable. It is made possible to control the degree of orientation in the longitudinal direction and width direction of a film, and the degree of molecular tension at the time of intermediate heat setting, transverse drawing, and final heat treatment described below by carrying out the lengthwise drawing under low ratio as described above and consequently, it is made possible to keep mechanical strength of a final film in the longitudinal direction even if the specific gravity of the film becomes lower than 1.00. If the drawing ratio of the lengthwise drawing is lower than 1.1 times, the advantageous effect of the lengthwise drawing cannot be substantially caused and the mechanical strength in the longitudinal direction may become insufficient in some cases and therefore, it is not so preferable. Further, the frequency of occurrence of the initial breakage tends to be increased and moreover, it becomes difficult to increase the line speed of a film formation apparatus. If the drawing ratio of the lengthwise drawing exceeds 1.8 times, although preferable data of the mechanical strength in the longitudinal direction and the frequency of occurrence of the initial breakage can be obtained, the shrinkage in the longitudinal direction tends to be too high and therefore, it is not so preferable.

Though irregularity of thickness in the lengthwise direction increases as the drawing ratio in the lengthwise direction becomes large, according to the study of the present inventors, there is observed a tendency that it becomes maximum at about 2.5 times, thereafter it lowers. That is, by setting the drawing ratio of lengthwise drawing to a relatively low ratio of 1.1 to 1.8 times, an effect of decreasing irregularity of thickness in the lengthwise direction is obtained.

The fact that the void-containing heat-shrinkable polyester film produced is a lengthwise and transverse-biaxially drawn film subjected to drawing in the lengthwise direction at 1.1 to 1.8 times can be found based on the fact that the heat shrinkage is 6% or higher in the direction orthogonal to the main shrinkage direction (generally, longitudinal direction of a film) in the case of treatment in hot air at 160° C. for 1 minute. The shrinkage at 160° C. in the longitudinal direction is rather considerably affected by mutual interaction of three steps; the lengthwise drawing step, the intermediate heat treatment step, and the transverse drawing step. In the invention, a preferable set temperature in the intermediate heat treatment step is 110° C. to 150° C. and the intermediate heat treatment temperature is the highest treatment temperature by the time of final heat treatment after cooling and solidifying a molten cast sheet. Consequently, the void-containing heat-shrinkable film of the invention does not show high heat shrinkage property in the longitudinal direction if it is treated in a temperature range lower than the intermediate heat treatment temperature, but shows a heat shrinkage property of 6% or higher as a result of being drawn in the lengthwise direction, for the evaluation at a temperature of 160° C., which is higher than the intermediate heat treatment temperature. It is more preferably 10% or higher. The investigations that have made by the inventors of the invention make it clear that the tearing property in the direction orthogonal to the main shrinkage direction is improved by orientation of the molecules in the direction and breakage hardly occurs at the time of processing and thus not only the product value but also the value in the label production step can be heightened, and those which have higher shrinkage at 160° C. are better in these properties. In addition, generally, an Abbe refractive index meter or a molecular orientation meter are used for evaluation of indexes showing the degree of orientation of molecular chains; however in the case of a void-containing film like the invention, evaluation may not be carried out well by these methods in some cases and the above-mentioned shrinkage at 160° C. can be an indication of the degree of orientation of a film in combination with the orientation state of both layers. It is supposed that in the case where the shrinkage at 160° C. in the direction orthogonal to the main shrinkage direction is 6% or higher, aimed physical properties can be satisfied simultaneously. In addition, regarding to the void-containing film of the invention, the fact that the molecules are oriented mainly in the width direction by drawing in the transverse direction can be clearly understood based on that the shrinkage at 90° C. in hot water in the width direction is 40% or higher.

(2) Intermediate Heat Treatment after Lengthwise Drawing

As described above, in order for "molecules not contributed to shrinkage force while being oriented in the longitudinal direction" to be present in a film, it is preferable to thermally relax molecules oriented in the longitudinal direction, but conventionally, in biaxial drawing of a film, between the first-axial drawing and the second-axial drawing, when a film is subjected to heat treatment at high temperature, the film is crystallized after heat treatment, so that the film cannot be drawn more, this fact was the technical common knowledge in the art. However, the present inventors have had a trial and error, and as a result, a surprising fact has been found out as follows; in a lengthwise-transverse drawing method, lengthwise drawing is conducted in a certain constant condition, an intermediate heat set is conducted in a predetermined condition with adjusting to the state of the film after the lengthwise drawing, and furthermore, with adjusting to the state of the film after the intermediate heat set, transverse drawing is conducted in a predetermined condition, thereby without causing breakage in the transverse drawing, to be able to make "molecules not contributed to shrinkage force while being oriented in the longitudinal direction" present in the film.

Namely, in the production of the film by a lengthwise-transverse drawing method in the invention, after an undrawn film is lengthwisely drawn, under a state that both edges in the width direction are held by clips in a tenter, it is preferable to conduct heat treatment (hereinafter called intermediate heat treatment) at a temperature of 110° C. or more and 150° C. or less for 5 second or more and 30 seconds or less. By conducting such intermediate heat treatment, it becomes possible that "molecules not contributed to shrinkage force while being oriented in the longitudinal direction" can be present in a film. Even in the case where any lengthwise drawing is conducted, "molecules not contributed to shrinkage force while being oriented in the longitudinal direction" cannot be necessarily to be present in a film, but by conducting the foregoing predetermined low ratio lengthwise drawing, it becomes possible that "molecules not contributed to shrinkage force while being oriented in the longitudinal direction" can be present in a film for the first time after intermediate heat treatment. Then, by conducting the following forced cooling and transverse drawing, it becomes possible to orient molecules to the width direction and exhibit shrinkage force in the width direction while maintaining "molecules not contributed to shrinkage force while being oriented in the longitudinal direction."

Additionally, the temperature of intermediate heat treatment is preferably 110° C. or more and 150° C. or less. When the lower limit of the temperature of intermediate heat treatment is less than 110° C., it is not preferable because a shrinkage force in the longitudinal direction of a film remains, and the shrinkage in the longitudinal direction of a film after drawing in the transverse direction becomes high. When the upper limit of the temperature of intermediate heat treatment is more than 150° C., it is not preferable because the film surface layer is roughened.

Additionally, the time of intermediate heat treatment is preferably 5 seconds or more and 30 seconds or less. In conducting the intermediate heat treatment for more than 30 seconds, the heat treatment can be done at a low temperature, but productivity becomes bad. In the case of less than 5 seconds, it is not preferable because a shrinkage force in the longitudinal direction of a film remains, and the shrinkage in the longitudinal direction of a film after drawing in the transverse direction becomes high.

In conducting the intermediate heat treatment as described above, it is preferable to adjust the condition of intermediate heat treatment so that the thermal shrinkage stress in the longitudinal direction of a film after intermediate heat treatment is 0.5 MPa or less. By conducting the intermediate heat treatment under such a predetermined condition, it becomes possible to control the degree of orientation in the longitudinal and width directions of a film, and the degree of molecular tension in the transverse drawing and final heat treatment.

(3) Forced Cooling of the Film after Intermediate Heat Treatment

In production of a film by the lengthwise-transverse drawing method in the invention, as described above, the film after intermediate heat treatment is not transversely drawn as it is, but it is preferable that a temperature of the film is quenched to be 70° C. or more and 90° C. or less. In quenching a film, when the temperature of the film after quenching keeps exceeding 90° C., the shrinkage in the width direction of the film becomes low and shrinkage becomes insufficient as a label and therefore, it is not so preferable. In addition, in quenching a film, when the temperature of the film after quenching keeps continues less than 70° C., stress of drawing becomes large, breakage of the film tends to occur and therefore, it is not so preferable.

(4) Control of Transverse Drawing Condition

In production of a film by the lengthwise-transverse drawing method in the invention, it is preferable to transversely drawing a film in a predetermined condition after lengthwise drawing, intermediate heat treatment and quenching. Namely, the transverse drawing is preferable to be carried out such that the ratio becomes 3.5 times or more and 5.0 times or less at a temperature of 65° C. or more and 85° C. or less, in a state that both edges in the width direction are held by clips in a tenter. By conducting the transverse drawing in such a predetermined condition, it becomes possible to orient molecules to the width direction and exhibit shrinkage force in the width direction while maintaining "molecules not contributed to shrinkage force while being oriented in the longitudinal direction" formed by lengthwise drawing and intermediate heat setting, and thus a film having good mechanical strength in the longitudinal direction in the case of being used as a label can be obtained. By adopting the lengthwise-transverse drawing, it is preferable to make the area drawing ratio larger than that of simple-monoaxially-drawn film in terms of attainment of smaller apparent specific gravity.

Also, if the drawing temperature is over 85° C., the shrinkage in the width direction tends to be low and at the same time, the thickness unevenness tends to be large and further, formation of voids with large volume at the time of drawing tends to be difficult and consequently, the apparent specific gravity tends to be high and therefore, it is not preferable. On the other hand, if the drawing temperature is lower than 65° C., the orientation in the width direction becomes too high and breakage tends to occur easily at the time of transverse drawing and therefore, it is not preferable. Additionally, if the drawing ratio is lower than 3.5 times, uniform drawing in the width direction cannot be carried out and the thickness becomes uneven and therefore, it is not preferable. On the other hand, if the drawing ratio exceeds 5.0 times, the orientation in the width direction becomes too high and breakage tends to occur easily at the time of drawing and therefore, it is not preferable.

After execution of the transverse drawing of the film, in the state where both edge parts in the width direction are held by clips in a tenter, it is preferable to carry out heat treatment at a temperature of 80° C. or higher and 100° C. or lower for 5 seconds or more and 30 seconds or lower. If the heat treatment is carried out at a temperature higher than 100° C., the heat shrinkage in the width direction becomes low and therefore, it is not preferable. Further, generally, the heat treatment is carried out under tense fixation; however, relaxing or widening the width by 20% or lower may be carried out simultaneously.

During, before, or after the above-mentioned drawing, one or both surfaces of the film may be subjected to corona treatment to improve adherability to a printing layer and/or an adhesive layer, etc.

During, before, or after the above-mentioned drawing step, one or both surfaces of the film may be applied to improve adherability, release property, antistatic property, slipping property, light shielding property, etc., of the film.

EXAMPLES

Hereinafter, the present invention will be described more specifically with reference to examples; however, the invention should not be limited to these examples, unless departing from the gist of the invention.

Evaluation methods of the film of the invention are as follows.

[Hot Water Shrinkage in Main Shrinkage Direction]

A film was cut into a square of 10 cm×10 cm and heat-shrunk in no load state for 10 seconds in hot water at a hot water temperature of 90° C.±0.5° C., and then the dimension of the film in the transverse direction (main shrinkage direction) was measured, and heat shrinkage was calculated according to the following Equation (3).

[Hot Water Shrinkage in Direction Orthogonal to Main Shrinkage Direction]

A film was cut into a square of 10 cm×10 cm and heat-shrunk in no load state for 10 seconds in hot water at a hot water temperature of 80° C.±0.5° C., and then the dimension of the film in the lengthwise direction (direction orthogonal to main shrinkage direction) was measured, and heat shrinkage was calculated according to the following Equation (3).

$$\text{Heat shrinkage} = ((\text{length before shrinkage} - \text{length after shrinkage})/\text{length before shrinkage}) \times 100(\%) \quad (3)$$

[Shrinkage with 160° C. Hot Air in Direction Orthogonal to Main Shrinkage Direction]

A strip with a length of 70 to 90 mm in the direction orthogonal to the main shrinkage direction and a length of 10 mm in the main shrinkage direction was cut out of a film, and mark lines were drawn in both end parts of a 50 mm section in the center part with a length of 70 to 90 mm in the orthogonal direction, and the strip was heated at a temperature of 160° C. in a hot air oven for 1 minute, and the length between the mark lines was measured after air cooling, and heat shrinkage was calculated according to the above-mentioned Equation (3).

[Heat Shrinkage Stress]

Using a strength and elongation measurement apparatus, Tensilon (equipped with a heating furnace) manufactured by Orientec Co., Ltd., a sample with a length of 160 mm in the main shrinkage direction and a width of 20 mm was cut out of a heat-shrinkable film, and the positions of the film to be chucked were sandwiched by corrugated cardboard pieces with a size of 30 mm×28 mm (see FIG. 1), and the sample was attached to a chuck at a chuck interval of 100 mm in the atmosphere previously heated to 90° C. while air blowing was stopped and thereafter, the door of the heating furnace was quickly closed and the stress detected when air blowing (blowing velocity of 5 m/second) was started was measured for 30 seconds, and the maximum value measured from a chart was defined as heat shrinkage stress (MPa).

[Apparent Specific Gravity of Film]

One sheet with a size of A4 (21.0 cm×29.7 cm) was cut out of a film to obtain a specimen. The thickness of the specimen was measured at 10 different points using a micrometer in 4 effective digits, and the average value of the thickness (t: μm) was calculated. The mass (w: g) of the one sheet specimen was measured by using an automatic scale balance in 4 effective digits, and apparent specific gravity was calculated according to the following Equation (4). The apparent specific gravity was rounded to two decimal places.

$$\text{Apparent specific gravity} = w/(21.0 \times 29.7 \times t \times 10^{-4}) = w \times 100/t \quad \text{Equation (4)}$$

[Average Value of Void Height]

A cross-section perpendicular to the film surface (width direction of the film) was photographed with a magnification of 2000 times by a scanning electron microscope (S-510 model, manufactured by Hitachi Ltd.), a drawing obtained by tracing voids in a tracing film and filling the voids was subjected to image processing by an image analyzer. The image analyzer used was an image scanner (GT-8000) manufactured by Seiko Epson Corporation, and the obtained image was loaded by a software (Adobe Photoshop™ 2.5 J) to a personal computer (manufactured by Macintosh) and subjected to image analysis by a software (Ultimage™/242.1.1). The height of respective voids was measured in the cross-sectional view showing the shapes of the voids and obtained in the above-mentioned manner. The average value of the void height was calculated according to the following Equation (5).

$$\text{Average value of void height} = \text{total height of respective voids} \div \text{number of voids} \quad \text{Equation (5)}$$

[Number of Initial Breakage]

Figure 3:
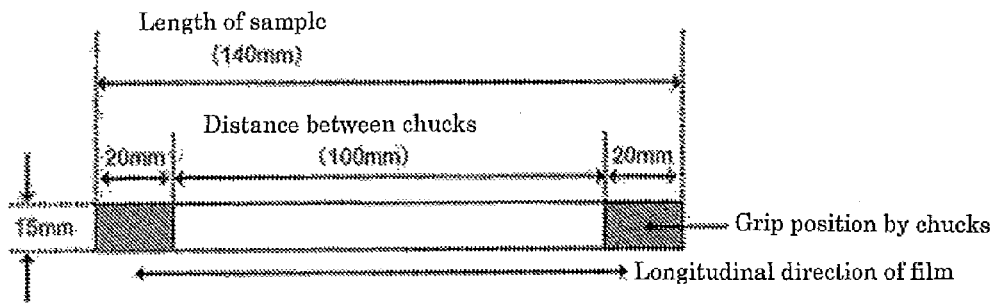
FIG. 3 A schematic drawing showing a specimen for measuring the number of initial breakage by a tensile test.
Figure 4:
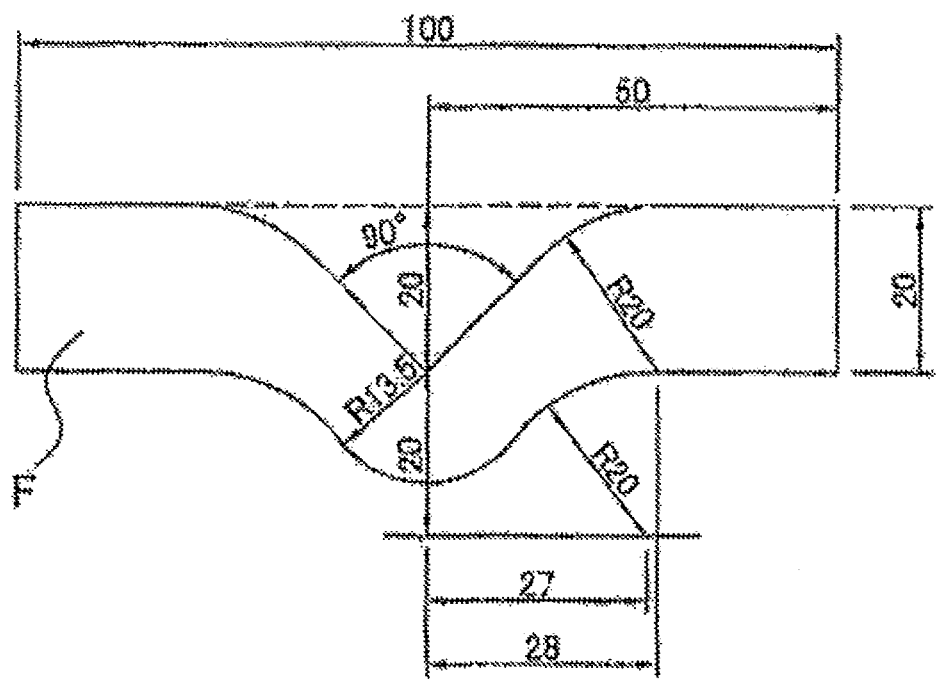
FIG. 4 A schematic drawing showing a specimen for measuring right-angled tear strength.

A film was sampled in a rectangle of 140 mm in the longitudinal direction and 15 mm in the width direction. The sampled film was left for 4 weeks at a temperature of 30° C. and a humidity of 85%. The film was held at both ends of the test piece in the longitudinal direction using a universal tensile tester (the chuck grip position of one side: 20 mm, the distance between chucks: 100 mm) (see FIG. 3), and a tensile test was carried out under conditions of a temperature of 23° C. and a tensile speed of 200 mm/minute. The tensile test was repeated with 10 samples, and the number of times the samples were broken at 5% or lower elongation in the longitudinal direction of the film was measured, which was defined as the number of initial breakage.

[Melt Flow Rate of Incompatible Resin]

Measurement was carried out according to American Society for Testing and Materials ASTM-D1238.

[Flexural Modulus]

Measurement was carried out according to American Society for Testing and Materials ASTM-D790.

[Solvent Adhesive Strength]

1,3-Dioxolan was applied in an amount of 5±0.3 g/m² and an application width of 5±1 mm on a drawn film, and two pieces were bonded to seal. Thereafter, the seal part was cut out into a width of 15 mm in the direction orthogonal to the seal direction, which was set at 20 mm chuck interval to a universal tensile tester STM50 manufactured by Baldwin Co., Ltd., and tensile peeling was carried out in a condition of a tensile speed of 200 mm/minute to measure peeling resistance. The strength at that time was defined as solvent adhesive strength.

[Shrinkage Finish Property]

On a heat-shrinkable film, a three color-printing with green, gold and white ink of Toyo Ink Mfg Co., Ltd. was provided previously. By bonding both end parts of the printed film with dioxolan, a cylindrical-form label (label in which main shrinkage direction of the heat-shrinkable film was the circumferential direction) was produced. Thereafter, using a steam tunnel manufactured by Fuji Astec, Inc. (model: SH-1500-L), the test was carried out by using a PET bottle of 500 ml (trunk diameter 62 mm, minimum diameter of neck part 25 mm) at a zone temperature of 80° C. with a passing time of 10 seconds. The evaluation was carried out visually, and the criteria were as follows.

Good: no wrinkle, jumping up and lack of shrinkage occurs.

Poor: wrinkle, jumping up or lack of shrinkage occur.

[Label Adhesiveness]

A label was attached in the same condition as in the foregoing measuring condition of shrinkage finish property. Then, when the label attached and PET bottle were lightly twisted, it was "good" in the case of no movement of label, and "poor" in the case of slide or out of alignment of the label and bottle.

[Whole Light Transmittance]

Measurement was carried out according to JIS K 7136 by using NDH-2000T manufactured by Nippon Denshoku Industries Co., Ltd.

[Film Composition]

Composition Ratio of Copolymer Polyesters

About 5 mg of a polymer sample of an object layer to be measured, which was cut out of each layer of a laminated film, was dissolved in 0.7 mL of a mixed solution of deuterochloroform and trifluoroacetic acid (volume ratio 9/1), and measurement was carried out by using 1H-NMR (UNITY 50, manufactured by VARIAN).

[Method for Measuring Right-Angled Tear Strength]

After a film was shrunk by 10% in the width direction in hot water adjusted at 80° C., a test specimen with a prescribed size was produced according to JIS-K-7128. Thereafter, both edges of the specimen were held by a universal tensile tester (Autograph manufactured by Shimadzu Corporation), the specimen was measured for strength at tensile break in the main shrinkage direction in a condition of tensile speed 200 mm/min. The right-angled tear strength per unit thickness was calculated using the following Equation (6).

Right-angled tear strength=strength at tensile break÷thickness    Equation (6)

[Method for Measuring Tear Propagation Resistance]

A film was shrunk by 10% in the width direction in hot water adjusted at 80° C. Thereafter, according to JIS-K-7128, the film was cut into a size of main shrinkage direction× orthogonal direction=63 mm×75 mm and a 20 mm slit (cutting) was formed in the center of longer end edge (end edge along the orthogonal direction) so as to be orthogonal to the end edge to give a test specimen and measurement was carried out using a light load tearing machine manufactured by Toyo Seiki Co., Ltd., and the obtained value was defined as tear propagation resistance.

[Perforation-Tear Property]

A label to which perforations were previously provided in the direction orthogonal to the main shrinkage direction was attached on a PET bottle in the same condition as in the foregoing measuring condition of shrinkage finish property. The perforation was formed by providing a hole of 1 mm long in the intervals of 1.5 mm, and two lines of perforations were provided in width 12 mm and length 120 mm in the lengthwise direction of the label (height direction). Thereafter, this bottle was filled with 500 ml of water, cooled at 5° C., and perforations of the label of the bottle immediately after taking it out from a refrigerator were torn with fingertips, and the number of bottles cleanly torn along the perforations in the lengthwise direction thereby to be able to remove the label from the bottle was counted, defective fraction of perforation opening (%) was calculated (the number of measurement=20).

The polyesters used in examples were as follows.

Polyester a: polyethylene terephthalate

Polyester b: Polyester composed of 30% by mole of neopentyl glycol, 70% by mole of ethylene glycol and terephthalic acid Polyester c: Polyester raw material containing 50% by weight of polyester a and 50% by weight of titanium oxide Polyester d: polybutylene terephthalate Polyester j: Polyester composed of 30% by mole of 1,4-cyclohexanedimethanol, 70% by mole of ethyleneglycol and terephthalic acid Raw material e: Cyclic polyolefin resin (Product name: Topas (registered trade name) 6017, manufactured by Polyplastics Co., Ltd.)

Raw material f: Cyclic polyolefin resin (Product name: Topas (registered trade name) 6013, manufactured by Polyplastics Co., Ltd.)

Raw material g: Amorphous polystyrene resin (Product name: G797N, manufactured by Nippon Polystyrene Co., Ltd.)

Raw material h: Amorphous polyolefin resin (Product name: DX820, manufactured by Mitsui Chemicals, Inc.)

Raw material i: Amorphous polyolefin resin (Product name: DX845, manufactured by Mitsui Chemicals, Inc.)

TABLE 1

| | Raw material composition of polyester (mole %) | | | | | |
|---|---|---|---|---|---|---|
| | Dicarboxylic acid component | Polyhydric alcohol component | | | | Titanium oxide |
| | DMT | EG | NPG | CHDM | BD | (wt %) |
| Polyester a | 100 | 100 | — | — | — | — |
| Polyester b | 100 | 70 | 30 | — | — | — |
| Polyester c | Polyester a: 50 wt % | | | | | 50 |
| Polyester d | 100 | — | — | — | 100 | — |
| Polyester j | 100 | 70 | — | 30 | — | — |

TABLE 2

| | Product name | MFR (g/min) | Flexural modulus (MPa) |
|---|---|---|---|
| Raw material e | TOPAS ® 6017 | 1.5 | 3000 |
| Raw material f | TOPAS ® 6013 | 14 | 2900 |
| Raw material g | G797N | 30 | 3200 |
| Raw material h | DX820 | 180 | 1770 |
| Raw material i | DX845 | 9 | 1600 |

Examples 1 to 8, Comparative Examples 1 to 8

TABLE 3

| | Resin composition | | T die outlet | | Undrawn film | |
|---|---|---|---|---|---|---|
| | Layer A | Layer B | Shear velocity (sec$^{-1}$) | Draft ratio (—) | Layer structure | Apparent specific gravity (—) |
| Example 1 | a/b = 6/94 | b/c/d/e = 45/15/10/30 | 150 | 12.5 | A/B/A = 2/6/2 | 1.27 |
| Example 2 | a/b = 6/94 | b/c/d/e = 45/15/10/30 | 150 | 14.2 | A/B/A = 2/6/2 | 1.27 |
| Example 3 | a/b = 6/94 | b/c/d/f = 45/15/10/30 | 150 | 12.5 | A/B/A = 2/6/2 | 1.27 |
| Example 4 | a/b = 6/94 | b/c/d/e/g = 45/15/10/10/20 | 150 | 12.5 | A/B/A = 2/6/2 | 1.27 |
| Example 5 | a/b = 6/94 | b/c/d/e = 55/15/10/20 | 110 | 12.5 | A/B/A = 2/6/2 | 1.27 |
| Comparative Example 1 | a/b = 6/94 | b/c/d/g = 45/15/10/30 | 150 | 12.5 | A/B/A = 2/6/2 | 1.27 |
| Comparative Example 2 | a/b = 6/94 | b/c/d/h = 45/15/10/30 | 150 | 12.5 | A/B/A = 2/6/2 | 1.27 |
| Comparative Example 3 | a/b = 6/94 | b/c/d/e = 45/15/10/30 | 150 | 12.5 | A/B/A = 2/6/2 | 1.27 |
| Comparative Example 4 | a/b = 6/94 | b/c/d/e = 45/15/10/30 | 110 | 21.0 | A/B/A = 2/6/2 | 1.27 |

TABLE 3-continued

| | | | | | | | |
|---|---|---|---|---|---|---|---|
| Comparative Example 5 | a/b = 6/94 | b/c/d/e = 45/15/10/30 | 150 | 12.5 | A/B/A = 2/6/2 | 1.27 | |
| Example 6 | a/j = 6/94 | j/c/d/e = 45/15/10/30 | 150 | 12.5 | A/B/A = 2/6/2 | 1.26 | |
| Comparative Example 6 | a/b = 6/94 | b/c/d/e = 45/15/10/30 | 150 | 12.5 | A/B/A = 2/6/2 | 1.27 | |
| Example 7 | a/b = 6/94 | b/c/d/e = 45/15/10/30 | 70 | 16 | A/B/A = 2/6/2 | 1.27 | |
| Example 8 | a/b = 6/94 | b/c/d/e = 45/15/10/30 | 150 | 10.3 | A/B/A = 2/6/2 | 1.27 | |
| Comparative Example 7 | a/b = 6/94 | b/c/d/e = 45/15/10/30 | 150 | 10.3 | A/B/A = 2/6/2 | 1.27 | |
| Comparative Example 8 | a/b = 6/94 | b/c/d/e = 45/15/10/30 | 150 | 12.5 | A/B/A = 2/6/2 | 1.27 | |

| | Lengthwise drawing step | | Intermediate heat treatment step | | Forced cooling step | Transverse drawing step | | Final heat treatment step | |
|---|---|---|---|---|---|---|---|---|---|
| | Preheat temperature (° C.) | Drawing ratio | Temperature (° C.) | Time (sec) | Temperature of film (° C.) | Drawing temperature (° C.) | Drawing ratio | Temperature (° C.) | Time (sec) |
| Example 1 | 85 | 1.5 | 120 | 10 | 80 | 75 | 4 | 82 | 10 |
| Example 2 | 85 | 1.2 | 120 | 10 | 80 | 75 | 4 | 82 | 10 |
| Example 3 | 85 | 1.5 | 120 | 10 | 80 | 75 | 4 | 82 | 10 |
| Example 4 | 85 | 1.5 | 120 | 10 | 80 | 75 | 4 | 82 | 10 |
| Example 5 | 85 | 1.7 | 130 | 10 | 80 | 75 | 4 | 82 | 10 |
| Comparative Example 1 | 85 | 1.5 | 120 | 10 | 80 | 75 | 4 | 82 | 10 |
| Comparative Example 2 | 85 | 1.5 | 120 | 10 | 80 | 75 | 4 | 82 | 10 |
| Comparative Example 3 | 85 | 1.5 | 120 | 10 | 80 | 90 | 4 | 82 | 10 |
| Comparative Example 4 | — | — | — | — | (Preheat) 80 | 75 | 4 | 82 | 10 |
| Comparative Example 5 | 85 | 1.5 | 120 | 10 | 80 | 75 | 4 | 110 | 10 |
| Example 6 | 85 | 1.5 | 120 | 10 | 80 | 75 | 4 | 82 | 10 |
| Comparative Example 6 | 85 | 1.5 | 120 | 10 | 95 | 95 | 4 | 95 | 10 |
| Example 7 | 85 | 1.5 | 120 | 10 | 80 | 75 | 4 | 82 | 10 |
| Example 8 | 85 | 1.5 | 120 | 10 | 80 | 75 | 4 | 82 | 10 |
| Comparative Example 7 | 85 | 2.0 | 120 | 10 | 80 | 75 | 4 | 82 | 10 |
| Comparative Example 8 | 85 | 1.5 | 90 | 10 | 80 | 75 | 4 | 82 | 10 |

Example 1

Polyesters for layer A obtained by mixing 6% by mass of polyester a and 94% by mass of polyester b, and polyesters for layer B obtained by mixing 45% by mass of polyester b, 15% by mass of polyester c, 10% by mass of polyester d, and 30% by mass of raw material e were respectively molten at 280° C., and co-extruded from a T die such that the layer thickness ratio was adjusted to layer A/layer B/layer A=20/60/20, and quenched by chill rolls to obtain an undrawn multilayer film with a thickness of 160 μm. The shear velocity of the T die at that time was 150 sec$^{-1}$ and the draft ratio was 12.5.

The undrawn film obtained in the above-mentioned manner was introduced to a lengthwise drawing machine in which a plurality of roll groups were continuously disposed, and drawn in the lengthwise direction by using the difference of rotary speed of rolls. That is, the undrawn film was preheated on a preheating roll until the film temperature became 85° C., and then lengthwisely drawn 1.5 times by using the rotary speed difference between a low-speed rotary roll whose surface temperature was set at 85° C. and a high-speed rotary roll whose surface temperature was set at 30° C.

Thereafter, while both end sides in the width direction were held by clips, the lengthwisely drawn film was heat-treated at 120° C. and wind velocity of 18 m/second for 10 seconds and then cooled, and the film was introduced to a cooling zone and positively cooled by blowing air at low temperature until the surface temperature of the film was decreased to 80° C., and the film after the cooling was introduced to a transverse drawing zone and drawn 4.0 times at 75° C. in the width direction (transverse direction).

Thereafter, while both end sides in the width direction were held by clips, the transversely drawn film was introduced to a final heat treatment zone in a tenter, heat-treated in the final heat treatment zone at a temperature of 82° C. for 10 seconds, and then cooled, both edge parts were cut and removed, and the film was wound in a roll-like state. A biaxially drawn film of about 40 μm was continuously produced. Then, the properties of the obtained film were evaluated by the above-mentioned methods. The evaluation results are shown in Table 4 and Table 6.

Example 2

A biaxially drawn film was continuously produced by the same method as in Example 1, except that the drawing ratio in the lengthwise direction was set to be 1.2 times and the thickness of the undrawn multilayer film was set to be 125 μm. The shear velocity of the T die at the time of melt extrusion was 150 sec$^{-1}$ and the draft ratio was 14.2. Then, the properties of the obtained film were evaluated by the same method as in Example 1. The evaluation results are shown in Table 4 and Table 6.

Example 3

A biaxially drawn film was continuously produced by the same method as in Example 1, except that polyesters for layer B obtained by mixing 45% by mass of polyester b, 15% by mass of polyester c, 10% by mass of polyester d, and 30% by mass of raw material f were respectively molten at 280° C., and the layer thickness ratio was adjusted to layer A/layer B/layer A=20/60/20. The shear velocity of the T die at the time of melt extrusion was 150 sec$^{-1}$ and the draft ratio was 12.5. Then, the properties of the obtained film were evaluated by the same method as in Example 1. The evaluation results are shown in Table 4.

Example 4

A biaxially drawn film was continuously produced by the same method as in Example 1, except that polyesters for layer B obtained by mixing 45% by mass of polyester b, 15% by mass of polyester c, 10% by mass of polyester d, 10% by mass of raw material e, and 20% by mass of raw material g were respectively molten at 280° C., and the layer thickness ratio was adjusted to layer A/layer B/layer A=20/60/20. The shear velocity of the T die at the time of melt extrusion was 150 sec$^{-1}$ and the draft ratio was 12.5 Then, the properties of the obtained film were evaluated by the same method as in Example 1. The evaluation results are shown in Table 4 and Table 6.

Example 5

A biaxially drawn film was continuously produced by the same method as in Example 1, except that polyesters for layer B obtained by mixing 55% by mass of polyester b, 15% by mass of polyester c, 10% by mass of polyester d, and 20% by mass of raw material e were respectively molten at 280° C., the layer thickness ratio was adjusted to layer A/layer B/layer A=20/60/20, the drawing ratio in the lengthwise direction was set to be 1.7 times, and the temperature in the intermediate heat treatment zone was adjusted to 130° C. The shear velocity of the T die at the time of melt extrusion was 110 sec$^{-1}$ and the draft ratio was 12.5 Then, the properties of the obtained film were evaluated by the same method as in Example 1. The evaluation results are shown in Table 4.

Example 6

A biaxially drawn film was continuously produced by the same method as in Example 1, except that polyesters for layer A obtained by mixing 6% by mass of polyester a, 94% by mass of polyester j, and polyesters for layer B obtained by mixing 45% by mass of polyester j, 15% by mass of polyester c, 10% by mass of polyester d, and 30% by mass of raw material e were respectively molten at 280° C., the layer thickness ratio was adjusted to layer A/layer B/layer A=20/60/20. The shear velocity of the T die at the time of melt extrusion was 150 sec$^{-1}$ and the draft ratio was 12.5 Then, the properties of the obtained film were evaluated by the same method as in Example 1. The evaluation results are shown in Table 4.

Example 7

A biaxially drawn film was continuously produced by the same method as in Example 1, except that the shear velocity of the T die was set to be 70 sec$^{-1}$ at the time of melt extrusion and the draft ratio was set to be 16. Then, the properties of the obtained film were evaluated by the same method as in Example 1. The evaluation results are shown in Table 4.

Example 8

A biaxially drawn film was continuously produced by the same method as in Example 1, except that the shear velocity of the T die was set to be 150 sec$^{-1}$ at the time of melt extrusion and the draft ratio was set to be 10.3. Then, the properties of the obtained film were evaluated by the same method as in Example 1. The evaluation results are shown in Table 4.

Comparative Example 1

A biaxially drawn film was continuously produced by the same method as in Example 1, except that polyesters for layer B obtained by mixing 45% by mass of polyester b, 15% by mass of polyester c, 10% by mass of polyester d, and 30% by mass of raw material g were respectively molten at 280° C., and the layer thickness ratio was adjusted to layer A/layer B/layer A=20/60/20. The shear velocity of the T die at the time of melt extrusion was 150 sec$^{-1}$ and the draft ratio was 12.5 Then, the properties of the obtained film were evaluated by the same method as in Example 1. The evaluation results are shown in Table 4.

Comparative Example 2

A biaxially drawn film was continuously produced by the same method as in Example 1, except that polyesters for layer B obtained by mixing 45% by mass of polyester b, 15% by mass of polyester c, 10% by mass of polyester d, and 30% by mass of raw material h were respectively molten at 280° C., and the layer thickness ratio was adjusted to layer A/layer B/layer A=20/60/20. The shear velocity of the T die at the time of melt extrusion was 150 sec$^{-1}$ and the draft ratio was 12.5 Then, the properties of the obtained film were evaluated by the same method as in Example 1. The evaluation results are shown in Table 4.

Comparative Example 3

A biaxially drawn film was continuously produced by the same method as in Example 1, except that the drawing temperature in the transverse direction was set to be 90° C. The shear velocity of the T die at the time of melt extrusion was 150 sec$^{-1}$ and the draft ratio was 12.5 Then, the properties of the obtained film were evaluated by the same method as in Example 1. The evaluation results are shown in Table 4.

Comparative Example 4

A biaxially drawn film was continuously produced by the same method as in Example 1, except that the thickness of the undrawn multilayer film was set to be 110 μm, the drawing in the lengthwise direction and successive intermediate heat treatment were not carried out, and after preheating was carried out until the film temperature became 80° C., drawing 4.0 times only in the width direction (transverse direction) was carried out at 75° C. The shear velocity of the T die at the time of melt extrusion was 110 sec$^{-1}$ and the draft ratio was 21.0. Then, the properties of the obtained film were evaluated by the same method as in Example 1. The evaluation results are shown in Table 4 and Table 6.

Comparative Example 5

A biaxially drawn film was continuously produced by the same method as in Example 1, except that the heat treatment temperature after the drawing in the transverse direction was set to be 110° C. The shear velocity of the T die at the time of melt extrusion was 150 sec$^{-1}$ and the draft ratio was 12.5 Then, the properties of the obtained film were evaluated by the same method as in Example 1. The evaluation results are shown in Table 4.

Comparative Example 6

A biaxially drawn film was continuously produced by the same method as in Example 1, except that the surface temperature of the film in the forced cooling step after the intermediate heat treatment step was 95° C., and the drawing temperature in the transverse drawing step was set to be 95° C., and the heat treatment temperature after the drawing in the transverse direction was set to be 95° C. The shear velocity of the T die at the time of melt extrusion was 150 sec$^{-1}$ and the draft ratio was 12.5 Then, the properties of the obtained film were evaluated by the same method as in Example 1. The evaluation results are shown in Table 4.

Comparative Example 7

A biaxially drawn film was continuously produced by the same method as in Example 1, except that the drawing ratio in the lengthwise direction was set to be 2.0 times and the thickness of the undrawn multilayer film was set to be 210 μm. The shear velocity of the T die at the time of melt extrusion was 150 sec$^{-1}$ and the draft ratio was 10.3. Then, the properties of the obtained film were evaluated by the same method as in Example 1. The evaluation results are shown in Table 4 and Table 6.

Comparative Example 8

A biaxially drawn film was continuously produced by the same method as in Example 1, except that the temperature of the intermediate heat treatment step after the lengthwise drawing was set to be 90° C. The shear velocity of the T die at the time of melt extrusion was 150 sec$^{-1}$ and the draft ratio was 12.5 Then, the properties of the obtained film were evaluated by the same method as in Example 1. The evaluation results are shown in Table 4.

TABLE 4

| | Properties of void-containing heat-shrinkable film | | | | | |
|---|---|---|---|---|---|---|
| | | 160° C. Heat shrinkage in the longitudinal direction (%) | Hot-water shrinkage (%) | | Average value of void height (μm) | Apparent specific gravity (—) |
| | Thickness (μm) | | 80° C. Longitudinal direction | 90° C. Width direction | | |
| Example 1 | 40 | 10 | 0 | 65 | 3.0 | 0.89 |
| Example 2 | 39 | 6.5 | −1 | 66 | 2.7 | 0.92 |
| Example 3 | 38 | 10.5 | 0 | 65 | 2.5 | 0.95 |
| Example 4 | 40 | 9 | 0 | 65 | 3.1 | 0.90 |
| Example 5 | 38 | 15 | 1.5 | 69 | 2.8 | 0.96 |
| Comparative Example 1 | 34 | 9.5 | 0 | 66 | 1.6 | 1.06 |
| Comparative Example 2 | 29 | 10 | 0 | 65 | 0.8 | 1.18 |
| Comparative Example 3 | 34 | 8 | 0 | 51 | 2.9 | 1.08 |
| Comparative Example 4 | 38 | 4 | 0 | 67 | 2.4 | 0.95 |
| Comparative Example 5 | 39 | 5 | 0 | 18 | 3.0 | 0.93 |
| Example 6 | 40 | 8 | −0.5 | 63 | 2.8 | 0.93 |
| Comparative Example 6 | 37 | 8.5 | 0 | 38 | 3 | 1.1 |
| Example 7 | 43 | 9 | 0.5 | 64 | 3.6 | 0.84 |
| Example 8 | 44 | 10 | 0 | 65 | 3.9 | 0.82 |
| Comparative Example 7 | 37 | 18 | 5 | 65 | 3.9 | 0.78 |
| Comparative Example 8 | 41 | 23 | 6 | 66 | 3 | 0.9 |

| | Properties of void-containing heat-shrinkable film | | | | | |
|---|---|---|---|---|---|---|
| | Number of initial breakage | Solvent adhesive strength (N/15 mm) | Shrinkage stress (MPa) | Whole light transmittance | Label adhesiveness | Shrinkage finish property |
| Example 1 | 0 | 4.8 | 7.0 | 20 | Good | Good |
| Example 2 | 2 | 4.9 | 6.8 | 21 | Good | Good |
| Example 3 | 0 | 4.8 | 7.1 | 21 | Good | Good |
| Example 4 | 0 | 4.8 | 7.0 | 19 | Good | Good |
| Example 5 | 0 | 4.5 | 7.5 | 18 | Good | Good |
| Comparative Example 1 | 0 | 4.7 | 7.4 | 35 | Good | Good |
| Comparative Example 2 | 0 | 4.6 | 7.7 | 41 | Good | Good |

TABLE 4-continued

| | | | | | | |
|---|---|---|---|---|---|---|
| Comparative Example 3 | 7 | 5.1 | 6.2 | 34 | Poor | Poor |
| Comparative Example 4 | 10 | 4.8 | 6.0 | 27 | Good | Good |
| Comparative Example 5 | 4 | 4.4 | 2.1 | 26 | Poor | Poor |
| Example 6 | 0 | 4.6 | 6 | 22 | Good | Good |
| Comparative Example 6 | 8 | 4.3 | 3.4 | 33 | Poor | Poor |
| Example 7 | 3 | 4.6 | 5.7 | 23 | Good | Good |
| Example 8 | 3 | 4.6 | 5.1 | 22 | Good | Good |
| Comparative Example 7 | 0 | 4.2 | 4.7 | 22 | Good | Poor |
| Comparative Example 8 | 0 | 4.7 | 6.7 | 21 | Good | Poor |

As is apparent from Table 4, all the films obtained in Examples 1 to 6 had excellent shrinkage finish property, apparent specific gravity, and average void height. Further, all the films obtained in Examples 1 to 6 had no problem on mechanical strength in the longitudinal direction, high solvent adhesive strength and sufficient light shielding property. In Example 7, the shear velocity of the T die at the time of melt extrusion was adjusted to low, and in Example 8, the draft ratio was adjusted to low, and void-containing heat-shrinkable films having particularly high average void height and small apparent specific gravity were obtained.

On the other hand, all the void-containing heat-shrinkable films obtained in Comparative Examples 1 and 2 had small void height and high apparent specific gravity. The void-containing heat-shrinkable film obtained in Comparative Example 3 had high apparent specific gravity and a large number of initial breakage. The void-containing heat-shrinkable film obtained in Comparative Example 4 had a large number of initial breakage. Since in this comparative example, transverse uniaxial drawing was carried out, the data of the hot air shrinkage evaluation in the longitudinal direction at 160° C. was lower than 6%. The void-containing heat-shrinkable film obtained in Comparative Example 5 had insufficient heat shrinkage property in the width direction. The film of this comparative example was a biaxially drawn film; however the set temperature in the final heat treatment step was too high, and the heat shrinkage was insufficient in the entire film and as a result, the data of the hot air shrinkage in the longitudinal direction at 160° C. was lower than 6%. The void-containing heat-shrinkable film obtained in Comparative Example 6 had low hot water shrinkage in the width direction and was unsatisfactory in shrinkage finish property, and the number of initial breakage was high. The void-containing heat-shrinkable films obtained in Comparative Examples 7 and 8 had high hot water shrinkage in the longitudinal direction and were unsatisfactory in shrinkage finish property. As described above, the heat-shrinkable polyester films obtained in comparative examples were all inferior in quality and in practical applicability.

Examples 1, 2, 4, 9 to 12 and Comparative Examples 4, and 9 to 12

TABLE 5

| | Resin composition | | T die outlet | | Undrawn film | |
|---|---|---|---|---|---|---|
| | | | Shear velocity | Draft ratio | | Apparent specific gravity |
| | Layer A | Layer B | (sec$^{-1}$) | (—) | Layer structure | (—) |
| Example 1 | a/b = 6/94 | b/c/d/e = 45/15/10/30 | 150 | 12.5 | A/B/A = 2/6/2 | 1.27 |
| Example 2 | a/b = 6/94 | b/c/d/e = 45/15/10/30 | 150 | 14.2 | A/B/A = 2/6/2 | 1.27 |
| Example 4 | a/b = 6/94 | b/c/d/e/g = 45/15/10/10/20 | 150 | 12.5 | A/B/A = 2/6/2 | 1.27 |
| Example 9 | a/b = 6/94 | b/c/d/e = 40/15/10/35 | 150 | 12.5 | A/B/A = 2.5/5/2.5 | 1.27 |
| Example 10 | a/b = 6/94 | b/c/d/e/i = 45/15/10/15/15 | 150 | 13.1 | A/B/A = 2/6/2 | 1.26 |
| Example 11 | a/b = 6/94 | b/c/d/e/g = 47/15/10/8/20 | 150 | 12.5 | A/B/A = 1.5/7/1.5 | 1.26 |
| Example 12 | a/b = 6/94 | b/c/d/e = 45/15/10/30 | 110 | 12.5 | A/B/A = 2/6/2 | 1.26 |
| Comparative Example 4 | a/b = 6/94 | b/c/d/e = 45/15/10/30 | 110 | 21.0 | A/B/A = 2/6/2 | 1.27 |
| Comparative Example 9 | a/b = 6/94 | b/c/d/g = 65/15/10/10 | 150 | 14.2 | A/B/A = 2.5/5/2.5 | 1.29 |
| Comparative Example 10 | — | a/b/c/d/i = 6/54/10/10/20 | 126 | 15.6 | A/B/A = 0/10/0 | 1.23 |
| Comparative Example 11 | a/b = 6/94 | b/c/d/e = 45/15/10/30 | 170 | 13.8 | A/B/A = 4/2/4 | 1.31 |
| Comparative Example 12 | a/b = 50/50 | b/c/d/e = 45/15/10/30 | 150 | 12.5 | A/B/A = 2/6/2 | 1.27 |

TABLE 5-continued

|  | Lengthwise drawing step | | Intermediate heat treatment step | | Forced cooling step | Transverse drawing step | | Final heat treatment step | |
| --- | --- | --- | --- | --- | --- | --- | --- | --- | --- |
|  | Preheat temperature (° C.) | Drawing ratio | Temperature (° C.) | Time (sec) | Temperature of film (° C.) | Drawing temperature (° C.) | Drawing ratio | Temperature (° C.) | Time (sec) |
| Example 1 | 85 | 1.5 | 120 | 10 | 80 | 75 | 4 | 82 | 10 |
| Example 2 | 85 | 1.2 | 120 | 10 | 80 | 75 | 4 | 82 | 10 |
| Example 4 | 85 | 1.5 | 120 | 10 | 80 | 75 | 4 | 82 | 10 |
| Example 9 | 85 | 1.5 | 120 | 10 | 80 | 75 | 4 | 82 | 10 |
| Example 10 | 85 | 1.5 | 120 | 10 | 80 | 75 | 4 | 82 | 10 |
| Example 11 | 85 | 1.5 | 120 | 10 | 80 | 75 | 4 | 82 | 10 |
| Example 12 | 85 | 1.7 | 130 | 10 | 80 | 75 | 4 | 82 | 10 |
| Comparative Example 4 | — | — | — | — | (Preheat)80 | 75 | 4 | 82 | 10 |
| Comparative Example 9 | 85 | 1.2 | 120 | 10 | 80 | 75 | 4 | 82 | 10 |
| Comparative Example 10 | 85 | 1.2 | 120 | 10 | 80 | 75 | 4 | 82 | 10 |
| Comparative Example 11 | 85 | 1.2 | 120 | 10 | 80 | 75 | 4 | 82 | 10 |
| Comparative Example 12 | 85 | 1.5 | 120 | 10 | 80 | 75 | 4 | 85 | 10 |

Example 9

A biaxially drawn film was continuously produced by the same method as in Example 1, except that polyesters for layer B obtained by mixing 40% by mass of polyester b, 15% by mass of polyester c, 10% by mass of polyester d, and 35% by mass of raw material e were respectively molten at 280° C., and the layer thickness ratio was adjusted to layer A/layer B/layer A=25/50/25. The shear velocity of the T die at the time of melt extrusion was 150 and the draft ratio was 12.5 Then, the properties of the obtained film were evaluated by the same method as in Example 1. The evaluation results are shown in Table 6.

Example 10

A biaxially drawn film was continuously produced by the same method as in Example 1, except that polyesters for layer B obtained by mixing 55% by mass of polyester b, 15% by mass of polyester c, 15% by mass of polyester e, and 15% by mass of raw material i were respectively molten at 280° C., and the layer thickness ratio was adjusted to layer A/layer B/layer A=20/60/20. The shear velocity of the T die at the time of melt extrusion was 110 and the draft ratio was 12.5 Then, the properties of the obtained film were evaluated by the same method as in Example 1. The evaluation results are shown in Table 6.

Example 11

A biaxially drawn film was continuously produced by the same method as in Example 1, except that polyesters for layer B obtained by mixing 47% by mass of polyester b, 15% by mass of polyester c, 10% by mass of polyester d, 8% by mass of raw material e, and 20% by mass of material g were respectively molten at 280° C., and the layer thickness ratio was adjusted to layer A/layer B/layer A=15/70/15. The shear velocity of the T die at the time of melt extrusion was 150 and the draft ratio was 12.5 Then, the properties of the obtained film were evaluated by the same method as in Example 1. The evaluation results are shown in Table 6.

Example 12

A biaxially drawn film was continuously produced by the same method as in Example 1, except that the drawing ratio in the lengthwise direction was set to be 1.7 times, the intermediate heat treatment temperature was set to be 130° C., and the thickness of the undrawn multilayer film was set to be 180 μm. The shear velocity of the T die at the time of melt extrusion was 110 and the draft ratio was 12.5. Then, the properties of the obtained film were evaluated by the same method as in Example 1. The evaluation results are shown in Table 6.

Comparative Example 9

A biaxially drawn film was continuously produced by the same method as in Example 1, except that polyesters for layer B obtained by mixing 65% by mass of polyester b, 15% by mass of polyester c, 10% by mass of polyester d, and 10% by mass of material g were respectively molten at 280° C., the layer thickness ratio was adjusted to layer A/layer B/layer A=25/50/25, the drawing ratio in the lengthwise direction was set to be 1.2 times and the thickness of the undrawn multilayer film was set to be 125 μm. The shear velocity of the T die at the time of melt extrusion was 150 and the draft ratio was 12.5. Then, the properties of the obtained film were evaluated by the same method as in Example 1. The evaluation results are shown in Table 6.

Comparative Example 10

A biaxially drawn film was continuously produced by the same method as in Example 1, except that the layer structure was changed to only layer B, polyesters for layer B obtained by mixing 6% by mass of polyester a, 54% by mass of polyester b, 10% by mass of polyester c, 10% by mass of polyester d, and 20% by mass of raw material i were respectively molten at 280° C., the drawing ratio in the lengthwise direction was set to be 1.2 times, and the layer thickness of the undrawn multilayer film was set to be 125 μm. The shear velocity of the T die at the time of melt extrusion was 126 and the draft ratio was 15.6. Then, the properties of the obtained film were evaluated by the same method as in Example 1. The evaluation results are shown in Table 6.

Comparative Example 11

A biaxially drawn film was continuously produced by the same method as in Example 1, except that the drawing ratio in the lengthwise direction was set to be 1.2 times, the thickness of the undrawn multilayer film was set to be 125 μm and the layer thickness ratio was adjusted to layer A/layer B/layer A=40/20/40. The shear velocity of the T die at the time of melt extrusion was 170 and the draft ratio was 13.8. Then, the properties of the obtained film were evaluated by the same method as in Example 1. The evaluation results are shown in Table 6.

Comparative Example 12

A biaxially drawn film was continuously produced by the same method as in Example 1, except that polyesters for layer A obtained by mixing 50% by weight of polyester a, and 50% by weight of polyester b were respectively molten at 280° C., the layer thickness ratio was adjusted to layer A/layer B/layer A=20/60/20, and the final heat treatment temperature after the transverse drawing was set to be 85° C. The shear velocity of the T die at the time of melt extrusion was 150 and the draft ratio was 12.5. Then, the properties of the obtained film were evaluated by the same method as in Example 1. The evaluation results are shown in Table 6.

TABLE 6

| | Properties of void-containing heat-shrinkable film | | | | |
|---|---|---|---|---|---|
| | | 160° C. Heat | Hot-water shrinkage (%) | | Apparent |
| | Thickness (μm) | shrinkage in the longitudinal direction (%) | 80° C. Longitudinal direction | 90° C. Width direction | specific gravity (—) |
| Example 1 | 40 | 10 | 0 | 65 | 0.89 |
| Example 2 | 39 | 6.5 | −1 | 66 | 0.92 |
| Example 4 | 40 | 9 | 0 | 65 | 0.90 |
| Example 9 | 37 | 11 | 0 | 67 | 0.95 |
| Example 10 | 38 | 10 | 0.5 | 66 | 0.96 |
| Example 11 | 44 | 8.5 | 0 | 62 | 0.84 |
| Example 12 | 42 | 15 | 1 | 66 | 0.86 |
| Comparative Example 4 | 38 | 4 | 0 | 67 | 0.95 |
| Comparative Example 9 | 33 | 6.5 | 0 | 69 | 1.16 |
| Comparative Example 10 | 50 | 6 | 0 | 57 | 0.82 |
| Comparative Example 11 | 37 | 7 | −1 | 70 | 1.22 |
| Comparative Example 12 | 41 | 5 | 0.5 | 38 | 0.88 |

| | Properties of void-containing heat-shrinkable film | | | | |
|---|---|---|---|---|---|
| | Right-angled tear strength (N/mm) | Tear propagation resistance (mN) | Solvent adhesive strength (N/15 mm) | Unevenness of shrinkage | Defective fraction of perforation opening |
| Example 1 | 205 | 330 | 4.8 | Good | 5 |
| Example 2 | 220 | 340 | 4.9 | Good | 5 |
| Example 4 | 200 | 310 | 4.8 | Good | 5 |
| Example 9 | 250 | 360 | 4.6 | Good | 10 |
| Example 10 | 240 | 400 | 4.5 | Good | 10 |
| Example 11 | 160 | 250 | 4.3 | Good | 10 |
| Example 12 | 180 | 275 | 4.7 | Good | 5 |
| Comparative Example 4 | 230 | 520 | 4.8 | Good | 35 |
| Comparative Example 9 | 310 | 1200 | 5.1 | Good | 25 |
| Comparative Example 10 | 165 | 540 | 3.5 | Good | 30 |
| Comparative Example 11 | 290 | 2100 | 5.7 | Good | 30 |
| Comparative Example 12 | 220 | 350 | 2.9 | Poor | 10 |

As is apparent from Table 6, all the films obtained in Examples 1, 2, 4, and 9 to 12 had excellent shrinkage finish property and perforation tear property. Further, all the films obtained in Examples 1, 2, 4, and 9 to 12 had high solvent adhesive strength and sufficient practical applicability.

On the other hand, the void-containing heat-shrinkable film obtained in Comparative Example 4 had high tear propagation resistance and inferior in perforation tear property. The void-containing heat-shrinkable films obtained in Comparative Examples 9 and 11 had high tear propagation resistance and high apparent specific gravity and therefore, it cannot necessarily be said that the perforation tear property was good. In the void-containing heat-shrinkable film obtained in Comparative Example 10, it cannot be said that the perforation tear property and the solvent adhesive property were both good. The void-containing heat-shrinkable film obtained in Comparative Example 12 had low hot water shrinkage in the width direction and inferior in shrinkage finish property, and also had low solvent adhesive strength. The film of this comparative example was a biaxially drawn film; however, the ratio of the amorphous component in the polymers constituting the film was low and the heat shrinkage was insufficient as a whole and as a result, the hot air shrinkage in the longitudinal direction at 160° C. was lower than 6%. As described above, the heat-shrinkable polyester films obtained in comparative examples were all inferior in quality and in practical applicability.

INDUSTRIAL APPLICABILITY

The void-containing heat-shrinkable polyester film of the invention has high quality and high practical applicability, and can be separated from water by specific gravity. Further, the void-containing heat-shrinkable polyester film of the invention has high quality and high practical applicability, and is excellent in solvent adhesive property and perforation tear property, and is particularly suitable for a shrinkable label.

The invention claimed is:

1. A void-containing heat-shrinkable polyester film comprising at least two layers, at least one layer of which is a polyester resin layer containing a cyclic polyolefin resin and a polystyrene resin and having voids,
wherein the cyclic polyolefin resin is present in an amount of 5 to 20% by mass based on the entire film weight,
wherein a total content of resins incompatible with a polyester resin is 10 to 20% by mass based on the entire film weight,
wherein the void-containing heat-shrinkable polyester film satisfies the following requirements (1) to (4) and (7):
(1) heat shrinkage in the main shrinkage direction is 40% or higher and 80% or lower when being treated in hot water at a treatment temperature of 90° C. for a treatment time of 10 seconds;
(2) heat shrinkage in the direction orthogonal to the main shrinkage direction is −2% or higher and 4% or lower when being treated in hot water at a treatment temperature of 80° C. for a treatment time of 10 seconds;
(3) apparent specific gravity is lower than 1.00;
(4) number of initial breakage, which is the number of breakage occurred at the time of 5% tensile, measured by repeating a tensile test with 10 times in the longitudinal direction while setting a distance between chucks of 100 mm and using a tensile tester after aging in an atmosphere of 30° C. and 85% RH for 672 hours is 4 times or lower, and
(7) shrinkage in the direction orthogonal to the main shrinkage direction is 6.5% or higher when being treated in hot air at a treatment temperature of 160° C. for a treatment time of 1 minute, and wherein the void-containing heat-shrinkable polyester film is prepared by a process comprising the following steps (a) to (e):
(a) a lengthwise drawing step of drawing an undrawn film at a temperature of 75° C. or higher and 100° C. or lower by 1.1 times or higher and 1.8 times or lower in the longitudinal direction;
(b) an intermediate heat treatment step of heat-treating the film after the lengthwise drawing at a temperature of 110° C. or higher and 150° C. or lower for 5 seconds or more and 30 seconds or lower in a state of holding both ends in the width direction by clips in a tenter;
(c) a positive cooling step of positively cooling the film after the intermediate heat treatment until the surface temperature becomes a temperature of 70° C. or higher and 90° C. or lower;
(d) a transverse drawing step of drawing the film after the positive cooling at a temperature of 65° C. or higher and 85° C. or lower by 3.5 times or higher and 5.0 times or lower in the width direction; and
(e) a final heat treatment step of heat treating the film after the transverse drawing at a temperature of 80° C. or higher and 100° C. or lower for 5 seconds or more and 30 seconds or lower in a state of holding both ends in the width direction by clips in a tenter.

2. The void-containing heat-shrinkable polyester film according to claim 1, wherein the average value of the void height in a cross section cut in the width direction at an arbitrary position is 2.0 µm or higher.

3. The void-containing heat-shrinkable polyester film according to claim 1, wherein the maximum value of the heat shrinkage stress in hot air at 90° C. is 10 MPa or lower.

4. The void-containing heat-shrinkable polyester film according to claim 1, wherein the film has at least one layer of a layer containing titanium oxide.

5. The void-containing heat-shrinkable polyester film according to claim 1, wherein the solvent adhesive strength is 4N/15 mm width or higher and 10 N/15 mm width or lower.

6. A void-containing heat-shrinkable polyester film comprising at least one layer of a polyester resin layer containing a cyclic polyolefin resin and a polystyrene resin and having voids, and a layer having no void laminated on the void-containing layer,
wherein the cyclic polyolefin resin is present in an amount of 5 to 20% by mass based on the entire film weight,
wherein a total content of resins incompatible with a polyester resin is 10 to 20% by mass based on the entire film weight,
wherein the void-containing heat-shrinkable polyester film satisfies the following requirements (1) to (3) and (5) to (7):
(1) heat shrinkage in the main shrinkage direction is 40% or higher and 80% or lower when being treated in hot water at a treatment temperature of 90° C. for a treatment time of 10 seconds;
(2) heat shrinkage in the direction orthogonal to the main shrinkage direction is −2% or higher and 4% or lower when being treated in hot water at a treatment temperature of 80° C. for a treatment time of 10 seconds;
(3) apparent specific gravity is lower than 1.00;
(5) tear propagation resistance in the direction orthogonal to the main shrinkage direction after 10% shrinkage in the main shrinkage direction is 100 mN or higher and 500 mN or lower and/or right-angled tear strength is 100 N/mm or higher and 300 N/mm or lower;
(6) solvent adhesive strength is 4N/15 mm width or higher and 10 N/15 mm width or lower, and
(7) shrinkage in the direction orthogonal to the main shrinkage direction is 6.5% or higher when being treated in hot air at a treatment temperature of 160° C. for a treatment time of 1 minute, and wherein the void-containing heat-shrinkable polyester film is prepared by a process comprising the following steps (a) to (e):
(a) a lengthwise drawing step of drawing an undrawn film at a temperature of 75° C. or higher and 100° C. or lower by 1.1 times or higher and 1.8 times or lower in the longitudinal direction;
(b) an intermediate heat treatment step of heat-treating the film after the lengthwise drawing at a temperature of 110° C. or higher and 150° C. or lower for 5 seconds or more and 30 seconds or lower in a state of holding both ends in the width direction by clips in a tenter;
(c) a positive cooling step of positively cooling the film after the intermediate heat treatment until the surface temperature becomes a temperature of 70° C. or higher and 90° C. or lower;
(d) a transverse drawing step of drawing the film after the positive cooling at a temperature of 65° C. or higher and 85° C. or lower by 3.5 times or higher and 5.0 times or lower in the width direction; and
(e) a final heat treatment step of heat treating the film after the transverse drawing at a temperature of 80° C. or higher and 100° C. or lower for 5 seconds or more and 30 seconds or lower in a state of holding both ends in the width direction by clips in a tenter.

7. The void-containing heat-shrinkable polyester film according to claim 6, wherein the average value of the void height in a cross section cut in the width direction at an arbitrary position is 2.0 μm or higher.

8. The void-containing heat-shrinkable polyester film according to claim 6, wherein the maximum value of the heat shrinkage stress in hot air at 90° C. is 10 MPa or lower.

9. The void-containing heat-shrinkable polyester film according to claim 6, wherein the film has at least one layer of a layer containing titanium oxide.

10. A process for producing a void-containing heat-shrinkable polyester film comprising at least two layers, at least one layer of which is a polyester resin layer containing a cyclic polyolefin resin and a polystyrene resin and having voids,
wherein the cyclic polyolefin resin is present in an amount of 5 to 20% by mass based on the entire film weight,
wherein a total content of resins incompatible with a polyester resin is 10 to 20% by mass based on the entire film weight, and wherein the void-containing heat-shrinkable polyester film satisfies the following requirements (1) to (4) and (7) or satisfies the following requirements (1) to (3) and (5) to (7):
(1) heat shrinkage in the main shrinkage direction is 40% or higher and 80% or lower when being treated in hot water at a treatment temperature of 90° C. for a treatment time of 10 seconds;
(2) heat shrinkage in the direction orthogonal to the main shrinkage direction is −2% or higher and 4% or lower when being treated in hot water at a treatment temperature of 80° C. for a treatment time of 10 seconds;
(3) apparent specific gravity is lower than 1.00;
(4) number of initial breakage, which is the number of breakage occurred at the time of 5% tensile, measured by repeating a tensile test with 10 times in the longitudinal direction while setting a distance between chucks of 100 mm and using a tensile tester after aging in an atmosphere of 30° C. and 85% RH for 672 hours is 4 times or lower,
(5) tear propagation resistance in the direction orthogonal to the main shrinkage direction after 10% shrinkage in the main shrinkage direction is 100 mN or higher and 500 mN or lower and/or right-angled tear strength is 100 N/mm or higher and 300 N/mm or lower;
(6) solvent adhesive strength is 4N/15 mm width or higher and 10 N/15 mm width or lower, and
(7) shrinkage in the direction orthogonal to the main shrinkage direction is 6.5% or higher when being treated in hot air at a treatment temperature of 160° C. for a treatment time of 1 minute,
the process comprising the following steps (a) to (e):
(a) a lengthwise drawing step of drawing an undrawn film at a temperature of 75° C. or higher and 100° C. or lower by 1.1 times or higher and 1.8 times or lower in the longitudinal direction;
(b) an intermediate heat treatment step of heat-treating the film after the lengthwise drawing at a temperature of 110° C. or higher and 150° C. or lower for 5 seconds or more and 30 seconds or lower in a state of holding both ends in the width direction by clips in a tenter;
(c) a positive cooling step of positively cooling the film after the intermediate heat treatment until the surface temperature becomes a temperature of 70° C. or higher and 90° C. or lower;
(d) a transverse drawing step of drawing the film after the positive cooling at a temperature of 65° C. or higher and 85° C. or lower by 3.5 times or higher and 5.0 times or lower in the width direction; and
(e) a final heat treatment step of heat treating the film after the transverse drawing at a temperature of 80° C. or higher and 100° C. or lower for 5 seconds or more and 30 seconds or lower in a state of holding both ends in the width direction by clips in a tenter.

11. The process for producing a void-containing heat-shrinkable polyester film according to claim 10, further comprising the following step (f):
(f) an extrusion step of discharging a molten resin under conditions that a shear velocity of a polymer flow in dies at the time of obtaining the undrawn film is 100 sec$^{-1}$ or higher and a draft ratio is 12 or higher.

12. The process for producing a void-containing heat-shrinkable polyester film according to claim 11, wherein the void-containing heat-shrinkable polyester film satisfies the following requirements (1) to (4) and (7):
(1) heat shrinkage in the main shrinkage direction is 40% or higher and 80% or lower when being treated in hot water at a treatment temperature of 90° C. for a treatment time of 10 seconds;
(2) heat shrinkage in the direction orthogonal to the main shrinkage direction is −2% or higher and 4% or lower when being treated in hot water at a treatment temperature of 80° C. for a treatment time of 10 seconds;
(3) apparent specific gravity is lower than 1.00;
(4) number of initial breakage, which is the number of breakage occurred at the time of 5% tensile, measured by repeating a tensile test with 10 times in the longitudinal direction while setting a distance between chucks of 100 mm and using a tensile tester after aging in an atmosphere of 30° C. and 85% RH for 672 hours is 4 times or lower, and (7) shrinkage in the direction orthogonal to the main shrinkage direction is 6.5% or higher when being treated in hot air at a treatment temperature of 160° C. for a treatment time of 1 minute.

13. The process for producing a void-containing heat-shrinkable polyester film according to claim 11, wherein the void-containing heat-shrinkable polyester film satisfies the following requirements (1) to (3) and (5) to (7):
   (1) heat shrinkage in the main shrinkage direction is 40% or higher and 80% or lower when being treated in hot water at a treatment temperature of 90° C. for a treatment time of 10 seconds;
   (2) heat shrinkage in the direction orthogonal to the main shrinkage direction is −2% or higher and 4% or lower when being treated in hot water at a treatment temperature of 80° C. for a treatment time of 10 seconds;
   (3) apparent specific gravity is lower than 1.00;
   (5) tear propagation resistance in the direction orthogonal to the main shrinkage direction after 10% shrinkage in the main shrinkage direction is 100 mN or higher and 500 mN or lower and/or right-angled tear strength is 100 N/mm or higher and 300 N/mm or lower;
   (6) solvent adhesive strength is 4N/15 mm width or higher and 10 N/15 mm width or lower, and
   (7) shrinkage in the direction orthogonal to the main shrinkage direction is 6.5% or higher when being treated in hot air at a treatment temperature of 160° C. for a treatment time of 1 minute.

14. The process for producing a void-containing heat-shrinkable polyester film according to claim 10, wherein the void-containing heat-shrinkable polyester film satisfies the following requirements (1) to (4) and (7):
   (1) heat shrinkage in the main shrinkage direction is 40% or higher and 80% or lower when being treated in hot water at a treatment temperature of 90° C. for a treatment time of 10 seconds;
   (2) heat shrinkage in the direction orthogonal to the main shrinkage direction is −2% or higher and 4% or lower when being treated in hot water at a treatment temperature of 80° C. for a treatment time of 10 seconds;
   (3) apparent specific gravity is lower than 1.00;
   (4) number of initial breakage, which is the number of breakage occurred at the time of 5% tensile, measured by repeating a tensile test with 10 times in the longitudinal direction while setting a distance between chucks of 100 mm and using a tensile tester after aging in an atmosphere of 30° C. and 85% RH for 672 hours is 4 times or lower, and
   (7) shrinkage in the direction orthogonal to the main shrinkage direction is 6.5% or higher when being treated in hot air at a treatment temperature of 160° C. for a treatment time of 1 minute.

15. The process for producing a void-containing heat-shrinkable polyester film according to claim 10, wherein the void-containing heat-shrinkable polyester film satisfies the following requirements (1) to (3) and (5) to (7):
   (1) heat shrinkage in the main shrinkage direction is 40% or higher and 80% or lower when being treated in hot water at a treatment temperature of 90° C. for a treatment time of 10 seconds;
   (2) heat shrinkage in the direction orthogonal to the main shrinkage direction is −2% or higher and 4% or lower when being treated in hot water at a treatment temperature of 80° C. for a treatment time of 10 seconds;
   (3) apparent specific gravity is lower than 1.00;
   (5) tear propagation resistance in the direction orthogonal to the main shrinkage direction after 10% shrinkage in the main shrinkage direction is 100 mN or higher and 500 mN or lower and/or right-angled tear strength is 100 N/mm or higher and 300 N/mm or lower;
   (6) solvent adhesive strength is 4N/15 mm width or higher and 10 N/15 mm width or lower, and
   (7) shrinkage in the direction orthogonal to the main shrinkage direction is 6.5% or higher when being treated in hot air at a treatment temperature of 160° C. for a treatment time of 1 minute.

* * * * *